United States Patent
Sullivan et al.

(10) Patent No.: US 6,634,963 B1
(45) Date of Patent: Oct. 21, 2003

(54) GOLF BALL COMPRISING SILICONE MATERIALS

(75) Inventors: Michael J. Sullivan, Chicopee, MA (US); R. Dennis Nesbitt, Westfield, MA (US); Mark L. Binette, Ludlow, MA (US)

(73) Assignee: The Top-Flite Golf Company, Chicopee, MA (US)

(*) Notice: Subject to any disclaimer, the term of this patent is extended or adjusted under 35 U.S.C. 154(b) by 28 days.

(21) Appl. No.: 09/702,344

(22) Filed: Oct. 31, 2000

Related U.S. Application Data

(63) Continuation of application No. 09/248,626, filed on Feb. 11, 1999, now Pat. No. 6,162,134, and a division of application No. 09/048,578, filed on Mar. 26, 1998, now Pat. No. 6,159,110, which is a continuation-in-part of application No. 08/716,016, filed on Sep. 19, 1996, now Pat. No. 5,820,489, which is a division of application No. 08/255,442, filed on Jun. 8, 1994, now abandoned, which is a continuation of application No. 08/054,406, filed on Apr. 28, 1993, now Pat. No. 5,368,304.

(60) Provisional application No. 60/042,117, filed on Mar. 28, 1997.

(51) Int. Cl.$^7$ .............................................. A63B 37/12
(52) U.S. Cl. ...................................................... 473/376
(58) Field of Search ................................. 473/373, 374, 473/376, 378, 370, 371, 367, 368, 369

(56) References Cited

U.S. PATENT DOCUMENTS

| | | |
|---|---|---|
| 878,254 A | 2/1908 | Taylor |
| 906,932 A | 12/1908 | Riblet |
| 922,773 A | 5/1909 | Kempshall |
| 985,741 A | 2/1911 | Harvey |
| 1,182,605 A | 5/1916 | Wadsworth |
| 1,265,036 A | 7/1918 | Bendelow |
| 1,286,834 A | 12/1918 | Taylor |
| 1,418,220 A | 5/1922 | White |
| 1,482,232 A | 1/1924 | Hazeltine |

(List continued on next page.)

FOREIGN PATENT DOCUMENTS

| | | |
|---|---|---|
| AU | 192618 | 1/1983 |
| GB | 4774 | 3/1892 |
| GB | 4360 | 2/1898 |
| GB | 20778 | 9/1911 |
| GB | 3012 | 2/1912 |
| GB | 22179 | 9/1912 |
| GB | 645 | 1/1914 |
| GB | 189551 | 9/1921 |
| GB | 377354 | 5/1931 |
| GB | 420410 | 1/1934 |
| GB | 2230531 | 10/1990 |
| GB | 2260546 | 5/1996 |
| WO | WO 98/43710 | 10/1998 |

OTHER PUBLICATIONS

Du Pont—Surlyn Grade Selector Guide (1985).
"The Curious History of the Golf ball, Mankind's Most Fascinating Sphere," John Stuart Martin, Horizon Press, N.Y. 1968. See pp. 88 and 89.

*Primary Examiner*—Mark S. Graham
*Assistant Examiner*—Raeann Gorden

(57) ABSTRACT

The present invention is directed to a golf ball comprising a soft core and a hard cover to produce a golf ball having a reduced spin rate. The present invention is also directed to an improved golf ball comprising at least one interior layer and/or a core comprising a silicone material. It is preferred to also utilize a multi-layer cover in conjunction with the silicone materials. The golf ball of the present invention may also utilize an enlarged diameter which serves to further reduce spin rate. The resulting golf ball exhibits properties of reduced spin without sacrificing durability, playability and resilience.

40 Claims, 4 Drawing Sheets

U.S. PATENT DOCUMENTS

| | | |
|---|---|---|
| 1,656,408 A | 1/1928 | Young |
| 1,666,699 A | 4/1928 | Hagen |
| 1,681,167 A | 8/1928 | Beldam |
| 1,716,435 A | 6/1929 | Fotheringham |
| 1,855,448 A | 4/1932 | Hazeltine |
| 2,002,726 A | 5/1935 | Young |
| D107,066 S | 11/1937 | Cavignac |
| 2,106,704 A | 2/1938 | Davis |
| 2,643,125 A | 6/1953 | Juve |
| 2,728,576 A | 12/1955 | Martin et al. |
| 2,730,159 A | 1/1956 | Semegen |
| 2,741,480 A | 4/1956 | Smith |
| 2,764,572 A | 9/1956 | Pechukas |
| 2,861,810 A | 11/1958 | Veatch |
| 2,997,302 A | 8/1961 | Smith |
| 3,031,194 A | 4/1962 | Strayer |
| RE25,427 E | 7/1963 | Harkins |
| 3,264,272 A | 8/1966 | Rees |
| 3,708,172 A | 1/1973 | Rango |
| D228,394 S | 9/1973 | Martin et al. |
| 3,756,607 A | 9/1973 | Lukinac et al. |
| 3,819,190 A | 6/1974 | Nepela et al. |
| 3,819,768 A | 6/1974 | Molitor |
| 3,940,145 A | 2/1976 | Gentiluomo |
| D243,866 S | 3/1977 | Shaw et al. |
| D247,685 S | 4/1978 | Haines et al. |
| 4,085,937 A | 4/1978 | Schenk |
| 4,090,716 A | 5/1978 | Martin et al. |
| 4,141,559 A | 2/1979 | Melvin et al. |
| 4,142,727 A | 3/1979 | Shaw et al. |
| 4,201,384 A | 5/1980 | Barber |
| 4,235,441 A | 11/1980 | Ciccarello |
| 4,256,304 A | 3/1981 | Smith et al. |
| 4,258,921 A | 3/1981 | Worst |
| 4,266,773 A | 5/1981 | Treadwell |
| 4,274,637 A | 6/1981 | Molitor |
| 4,284,276 A | 8/1981 | Worst |
| 4,346,898 A | 8/1982 | Badke |
| 4,431,193 A | 2/1984 | Nesbitt |
| 4,483,537 A | 11/1984 | Hanada et al. |
| 4,546,980 A | 10/1985 | Gendrea et al. |
| 4,560,168 A | 12/1985 | Aoyama |
| 4,625,964 A | 12/1986 | Yamada |
| 4,653,758 A | 3/1987 | Solheim |
| 4,660,834 A | 4/1987 | Carrigan |
| 4,681,323 A | 7/1987 | Alaki et al. |
| 4,683,257 A | 7/1987 | Kakiuchi et al. |
| 4,714,253 A | 12/1987 | Nakahara et al. |
| 4,720,111 A | 1/1988 | Yamada |
| 4,722,529 A | 2/1988 | Shaw et al. |
| 4,726,590 A | 2/1988 | Molitor |
| 4,729,567 A | 3/1988 | Oka et al. |
| 4,729,861 A | 3/1988 | Lynch et al. |
| 4,744,564 A | 5/1988 | Yamada |
| 4,762,326 A | 8/1988 | Gobush |
| 4,765,626 A | 8/1988 | Gobush |
| 4,770,422 A | 9/1988 | Isaac |
| 4,772,026 A | 9/1988 | Gobush |
| 4,787,638 A | 11/1988 | Kobayashi |
| 4,801,649 A | 1/1989 | Statz |
| 4,804,189 A | 2/1989 | Gobush |
| 4,813,677 A | 3/1989 | Oka et al. |
| 4,830,378 A | 5/1989 | Aoyama |
| 4,840,381 A | 6/1989 | Ihara et al. |
| 4,844,472 A | 7/1989 | Ihara |
| 4,848,766 A | 7/1989 | Oka et al. |
| 4,848,770 A | 7/1989 | Shama |
| 4,852,884 A | 8/1989 | Sullivan |
| 4,858,923 A | 8/1989 | Gobush et al. |
| 4,867,459 A | 9/1989 | Ihara |
| 4,869,512 A | 9/1989 | Nomura et al. |
| 4,877,252 A | 10/1989 | Shaw |
| 4,880,241 A | 11/1989 | Melvin et al. |
| 4,884,814 A | 12/1989 | Sullivan |
| 4,886,277 A | 12/1989 | Mackey |
| 4,915,389 A | 4/1990 | Ihara |
| 4,915,390 A | 4/1990 | Gobush et al. |
| 4,921,255 A | 5/1990 | Taylor |
| 4,925,193 A | 5/1990 | Melvin et al. |
| 4,932,664 A | 6/1990 | Pocklington et al. |
| 4,936,587 A | 6/1990 | Lynch et al. |
| 4,949,976 A | 8/1990 | Gobush |
| 4,955,966 A | 9/1990 | Yuki et al. |
| 4,960,283 A | 10/1990 | Gobush |
| 4,968,038 A | 11/1990 | Yamada |
| 4,971,330 A | 11/1990 | Morell |
| 4,973,057 A | 11/1990 | Morell |
| 4,974,853 A | 12/1990 | Morell |
| 4,974,854 A | 12/1990 | Morell |
| 4,974,855 A | 12/1990 | Morell |
| 4,974,856 A | 12/1990 | Morell |
| 4,979,747 A | 12/1990 | Jonkouski |
| 4,982,964 A | 1/1991 | Morell |
| 4,986,545 A | 1/1991 | Sullivan |
| 4,991,852 A | 2/1991 | Pattison |
| 4,998,733 A | 3/1991 | Lee |
| 5,000,459 A | 3/1991 | Isaac |
| 5,009,427 A | 4/1991 | Stiefel et al. |
| 5,009,428 A | 4/1991 | Yamagishi et al. |
| 5,016,887 A | 5/1991 | Jonkouski |
| 5,018,741 A | 5/1991 | Stiefel et al. |
| 5,024,444 A | 6/1991 | Yamagishi et al. |
| 5,033,750 A | 7/1991 | Yamagishi et al. |
| 5,044,638 A | 9/1991 | Nesbitt et al. |
| 5,046,742 A | 9/1991 | Mackey |
| 5,060,953 A | 10/1991 | Bunger et al. |
| 5,060,954 A | 10/1991 | Gobush |
| 5,062,644 A | 11/1991 | Lee |
| 5,064,199 A | 11/1991 | Morell |
| 5,068,151 A | 11/1991 | Nakamura |
| 5,072,945 A | 12/1991 | Oka et al. |
| 5,078,402 A | 1/1992 | Oka |
| 5,080,367 A | 1/1992 | Lynch et al. |
| 5,098,105 A | 3/1992 | Sullivan |
| 5,120,791 A | 6/1992 | Sullivan |
| 5,187,013 A | 2/1993 | Sullivan |
| 5,209,485 A | 5/1993 | Nesbitt et al. |
| 5,222,739 A | 6/1993 | Horiuchie et al. |
| 5,273,287 A | 12/1993 | Rees |
| 5,298,571 A | 3/1994 | Statz et al. |
| 5,304,608 A | 4/1994 | Yabuki et al. |
| 5,314,187 A | 5/1994 | Proudfit |
| 5,368,304 A | 11/1994 | Sullivan et al. |
| 5,387,637 A | 2/1995 | Sullivan |
| 5,397,129 A * | 3/1995 | Kato et al. .................. 473/356 |
| 5,482,286 A | 1/1996 | Molitor et al. |
| 5,580,057 A | 12/1996 | Sullivan et al. |
| 5,730,665 A * | 3/1998 | Shimosaka et al. .......... 473/376 |
| 5,733,207 A | 3/1998 | Sullivan et al. |
| 5,733,977 A * | 3/1998 | Takemura et al. ........... 473/377 |
| 5,779,562 A | 7/1998 | Melvin et al. |
| 5,846,141 A | 12/1998 | Morgan et al. |
| 6,162,134 A * | 12/2000 | Sullivan et al. .............. 473/373 |
| 6,242,521 B1 * | 6/2001 | Hwang ....................... 524/413 |

* cited by examiner

GOLF BALL COMPRISING SILICONE MATERIALS

CROSS REFERENCES TO RELATED APPLICATIONS

This is a continuation application of U.S. Ser. No. 09/248,626 filed Feb. 11, 1999 now U.S. Pat. No. 6,162,134, which is a continuation-in-part of U.S. Ser. No. 08/716,016 filed Sep. 19, 1996; now U.S. Pat. No. 5,820,489 which is a divisional of U.S. Ser. No. 08/255,442 filed Jun. 8, 1994; now abandoned which is a continuation of Ser. No. 08/054,406 filed Apr. 28, 1993 now U.S. Pat. No. 5,368,304. This is also a continuation-in-part of U.S. Ser. No. 09/048,578 filed Mar. 26, 1998 now U.S. Pat. No. 6,159,110 which claims priority from U.S. Provisional application No. 60/042,117 filed Mar. 28, 1997.

FIELD OF THE INVENTION

The present invention relates to golf balls and, more particularly, to improved two-piece, three-piece and multi-layered golf balls having low rates of spin. The improvement in the golf balls results from a combination of a relatively soft core and a hard cover made from blends of one or more specific hard, high stiffness ionomers. The combination of a soft core and a hard cover leads to an improved golf ball having a lower than anticipated spin rate while maintaining the resilience and durability characteristics necessary for repetitive play.

The present invention also relates to golf balls comprising one or more interior layers and/or a core comprising one or more silicone materials.

In an additional embodiment of the invention, the spin rate is further reduced by decreasing the weight of the relatively soft core while maintaining core size and by increasing the thickness of the cover. The larger, less dense finished ball exhibits lower spin rates after club impact than conventional balls.

BACKGROUND OF THE INVENTION

Spin rate is an important golf ball characteristic for both the skilled and unskilled golfer. High spin rates allow for the more skilled golfer, such as PGA professionals and low handicap players, to maximize control of the golf ball. This is particularly beneficial to the more skilled golfer when hitting an approach shot to-a green. The ability to intentionally produce "back spin", thereby stopping the ball quickly on the green, and/or "side spin" to draw or fade the ball, substantially improves the golfer's control over the ball. Thus, the more skilled golfer generally prefers a golf ball exhibiting high spin rate properties.

However, a high spin golf ball is not desirous by all golfers, particularly high handicap players who cannot intentionally control the spin of the ball. In this regard, less skilled golfers, have, among others, two substantial obstacles to improving their game: slicing and hooking. When a club head meets a ball, an unintentional side spin is often imparted which sends the ball off its intended course. The side spin reduces one's control over the ball as well as the distance the ball will travel. As a result, unwanted strokes are added to the game.

Consequently, while the more skilled golfer desires a high spin golf ball, a more efficient ball for the less skilled player is a golf ball that exhibits low spin properties. The low spin ball reduces slicing and hooking and enhances roll distance for the amateur golfer. The present inventors have addressed the need for developing a golf ball having a reduced spin rate after club impact, while at the same time maintaining durability, playability and resiliency characteristics needed for repeated use. The reduced spin rate golf ball of the present invention meets the rules and regulations established by the United States Golf Association (U.S.G.A.).

Along these lines, the U.S.G.A. has set forth five (5) specific regulations that a golf ball must conform to. The U.S.G.A. rules require that a ball be no smaller than 1.680 inches in diameter. However, notwithstanding this restriction, there is no specific limitation as to the maximum permissible diameter of a golf ball. As a result, a golf ball can be as large as desired so long as it is larger than 1.680 inches in diameter and so long as the other four (4) specific regulations are met.

The U.S.G.A. rules also require that balls weigh no more than 1.620 ounces, and that their initial velocity may not exceed 250 feet per second with a maximum tolerance of 2%, or up to 255 ft./sec. Further, the U.S.G.A. rules state that a ball may not travel a distance greater than 280 yards with a test tolerance of 6% when hit by the U.S.G.A. outdoor driving machine under specific conditions.

It has been determined by the present inventors that the combination of a relatively soft core (i.e. Riehle compression of about 75 (0.075) to about 160 (0.160)) and a hard cover (i.e. Shore D hardness of 65 or more) significantly reduces the overall spin rate of the resulting two piece golf ball. The inventors have also learned that an increase in cover thickness, thereby increasing the overall diameter of the resulting molded golf ball, further reduces spin rate.

Top-grade golf balls sold in the United States may be generally classified as one of two types: two-piece or three-piece balls. The two-piece ball, exemplified by the balls sold by Spalding & Evenflo Companies, Inc. (the assignee of the present invention through its wholly owned subsidiary, Lisco, Inc.) under the trademark TOP-FLITE, consists of a solid polymeric core and a separately formed outer cover. The so-called three-piece balls, exemplified by the balls sold under the trademark TITLEIST by the Acushnet Company, consist of a liquid (e.g., TITLEIST TOUR 384) or solid (e.g., TITLEIST DT) center, elastomeric thread windings about the center, and a cover.

Spalding's two-piece golf balls are produced by molding a natural (balata) or synthetic (i.e. thermoplastic resin such as an ionomer resin) polymeric cover composition around a preformed polybutadiene (rubber) core. During the molding process, the desired dimple pattern is molded into the cover material. In order to reduce the number of coating steps involved in the finishing of the golf balls, a color pigment or dye and, in many instances, an optical brightener, are added directly to the generally "off white" colored polymeric cover composition prior to molding. By incorporating the pigment and/or optical brightener in the cover composition molded onto the golf ball core, this process eliminates the need for a supplemented pigmented painting step in order to produce a white or colored (notably orange, pink and yellow) golf ball.

With respect to multi-layered golf balls, Spalding is the leading manufacturer of two-piece golf balls in the world. Spalding manufactures over sixty (60) different types of two-piece balls which vary distinctly in such properties as playability (i.e. spin rate, compression, feel, etc.), travel distance (initial velocity, C.O.R., etc.), durability (impact, cut and weather resistance) and appearance (i.e. whiteness, reflectance, yellowness, etc.) depending upon the ball's core, cover and coating materials, as well as the ball's surface configuration (i.e. dimple pattern). Consequently, Spalding's two-piece golf balls offer both the amateur and professional golfer a variety of performance characteristics to suit an individual's game.

In regard to the specific components of a golf ball, although the nature of the cover can, in certain instances, make a significant contribution to the overall feel, spin (control), coefficient of restitution (C.O.R.) and initial velocity of a ball (see, for example, U.S. Pat. No. 3,819,768 to Molitor), the initial velocity of two-piece and three-piece balls is determined mainly by the coefficient of restitution of the core. The coefficient of restitution of the core of wound (i.e. three-piece) balls can be controlled within limits by regulating the winding tension and the thread and center composition. With respect to two-piece balls, the coefficient of restitution of the core is a function of the properties of the elastomer composition from which it is made.

The cover component of a golf ball is particularly influential in effecting the compression (feel), spin rates (control), distance (C.O.R.), and durability (i.e. impact resistance, etc.) of the resulting ball. Various cover compositions have been developed by Spalding and others in order to optimize the desired properties of the resulting golf balls.

Over the last twenty (20) years, improvements in cover and core material formulations and changes in dimple patterns have more or less continually improved golf ball distance. Top-grade golf balls, however, must meet several other important design criteria. To successfully compete in today's golf ball market, a golf ball should be resistant to cutting and must be finished well; it should hold a line in putting and should have good click and feel. In addition, the ball should exhibit spin and control properties dictated by the skill and experience of the end user.

Prior artisans have utilized a wide array of different materials in golf balls in an attempt to obtain improved properties and performance. Despite the great number of different materials and combinations of materials employed in prior art golf balls, there still remains a need for an improved golf ball exhibiting superior properties and performance.

In an alternative embodiment, the spin rate of the ball is further reduced by increasing the thickness of the cover and/or decreasing the weight and softness of the core. By increasing the cover thickness and/or the overall diameter of the resulting molded golf ball, enhanced reduction in spin rate is observed.

With respect to the increased size of the ball, over the years golf ball manufacturers have generally produced golf balls at or around the minimum size and maximum weight specifications set forth by the U.S.G.A. There have, however, been exceptions, particularly in connection with the manufacture of. golf balls for teaching aids. For example, oversized, overweight (and thus unauthorized) golf balls have been on sale for use as golf teaching aids (see: U.S. Pat. No. 3,201,384 to Barber).

Oversized golf balls are also disclosed in New Zealand Patent 192,618 dated Jan. 1, 1980, issued to a predecessor of the present assignee. This patent teaches an oversize golf ball having a diameter between 1.700 and 1.730 inches and an oversized core of resilient material (i.e. about 1.585 to 1.595 inches in diameter) so as to increase the coefficient of restitution. Additionally, the patent discloses that the ball should include a cover having a thickness less than the cover thickness of conventional balls (i.e. a cover thickness of about 0.050 inches as opposed to 0.090 inches for conventional two-piece balls).

In addition, it is also noted that golf balls made by Spalding in 1915 were of a diameter ranging from 1.630 inches to 1.710 inches. As the diameter of the ball increased, the weight of the ball also increased. These balls were comprised of covers made up of balata/gutta percha and cores made from solid rubber or liquid sacs and wound with elastic thread.

Golf balls known as the LYNX JUMBO were also commercially available by Lynx in October, 1979. These balls had a diameter of 1.76 to 1.80 inches. The LYNX JUMBO balls met with little or no commercial success. The LYNX JUMBO balls consisted of a core comprised of wound core and a cover comprised of natural or synthetic balata.

However, notwithstanding the enhanced diameters of these golf balls, none of these balls produced the enhanced spin reduction characteristics and overall playability, distance and durability properties of the present invention and/or fall within the regulations set forth by the U.S.G.A. An object of the present invention is to produce a U.S.G.A. regulation golf ball having improved low spin properties while maintaining the resilience and durability characteristics necessary for repetitive play.

These and other objects and features of the invention will be apparent from the following summary and description of the invention and from the claims.

SUMMARY OF THE INVENTION

The present invention is directed to improved golf balls having a low rate of spin upon club impact. The golf balls comprise a soft core and a hard cover. The hard cover is preferably sized to be larger than conventional diameters. The low spin rate enables the ball to travel a greater distance. In addition, the low spin rate provides the less skilled golfer with more control. This is because the low spin rate decreases undesirable side spin which leads to slicing and hooking. The combination of a hard cover and a soft core provides for a ball having a lower than anticipated spin rate while maintaining high resilience and good durability.

The present invention provides, in one aspect, a golf ball comprising a core (which may be molded or wound) having a Riehle compression of at least about 75 (0.075), a cover layer, and at least one interior layer surrounding the core. The core and/or the interior layer include one or more silicone materials. The silicone materials are silicone polymers, silicone fluids, silicone elastomers, and silicone resins.

In another aspect, the present invention provides a golf ball comprising a core, a cover layer having a Shore D hardness of at least 65, and at least one interior layer disposed between the core and the cover layer. Either or both of the core and at least one interior layer comprises a silicone material.

In yet another aspect, the present invention provides a golf ball comprising a core having a Riehle compression of at least 75 (0.075), a cover layer having a Shore D hardness of at least 65, and at least one interior layer surrounding the core and disposed between the core and the cover layer. The cover layer is comprised of certain materials. And, either or both of the core and the interior layer(s) comprise a silicone material.

In another aspect, the present invention provides a golf ball comprising a core having a Riehle compression of at least 75 (0.075), an inner cover layer molded on the core, an outer cover layer molded on the inner cover layer, the outer cover layer having a Shore D hardness of at least 65 and formed from certain materials and at least one interior layer between the core and the outer cover layer. The core and/or the interior layer(s) include a silicone material.

As is apparent from the above discussions, two principal properties involved in golf ball performance are resilience and PGA compression. The resilience or coefficient of restitution (COR) of a golf ball is the constant "e," which is the ratio of the relative velocity of an elastic sphere after direct impact to that before impact. As a result, the COR ("e") can vary from 0 to 1, with 1 being equivalent to a perfectly or completely elastic collision and 0 being equivalent to a perfectly or completely inelastic collision.

COR, along with additional factors such as club head speed, club head mass, ball weight, ball size and density, spin rate, angle of trajectory and surface configuration (i.e., dimple pattern and area of dimple coverage) as well as environmental conditions (e.g. temperature, moisture, atmospheric pressure, wind, etc.) generally determine the distance a ball will travel when hit. Along this line, the distance a golf ball will travel under controlled environmental conditions is a function of the speed and mass of the club and size, density and resilience (COR) of the ball and other factors. The initial velocity of the club, the mass of the club and the angle of the ball's departure are essentially provided by the golfer upon striking. Since club head, club head mass, the angle of trajectory and environmental conditions are not determinants controllable by golf ball producers and the ball size and weight are set by the U.S.G.A., these are not factors of concern among golf ball manufacturers. The factors or determinants of interest with respect to improved distance are generally the coefficient of restitution (COR) and the surface configuration (dimple pattern, ratio of land area to dimple area, etc.) of the ball.

The COR of solid core balls is a function of the composition of the core and of the cover. The core and/or cover may be comprised of one or more layers such as in multi-layer balls. In balls containing a wound core (i.e., balls comprising a liquid or solid center, elastic windings, and a cover), the coefficient of restitution is a function of not only the composition of the center and cover, but also the composition and tension of the elastomeric windings. As in the solid core balls, the center and cover of a wound core ball may also consist of one or more layers. The COR of the golf balls of the present invention is a function of the composition and physical properties of the core and cover layer materials such as flex modulus, hardness and particularly, their resilience, i.e. ability to quickly recover from a high impact deformation.

The coefficient of restitution is the ratio of the outgoing velocity to the incoming velocity. In the examples of this application, the coefficient of restitution of a golf ball was measured by propelling a ball horizontally at a speed of 125±5 feet per second (fps) and corrected to 125 fps against a generally vertical, hard, flat steel plate and measuring the ball's incoming and outgoing velocity electronically. Speeds were measured with a pair of Oehler. Mark 55 ballistic screens available-from Oehler Research, Inc., P.O. Box 9135, Austin, Tex. 78766, which provide a timing pulse when an object passes through them. The screens were separated by 36" and are located 25.25" and 61.25" from the rebound wall. The ball speed was measured by timing the pulses from screen 1 to screen 2 on the way into the rebound wall (as the average speed of the ball over 36"), and then the exit speed was timed from screen 2 to screen 1 over the same distance. The rebound wall was tilted 2 degrees from a vertical plane to allow the ball to rebound slightly downward in order to miss the edge of the cannon that fired it. The rebound wall is solid steel 2.0 inches thick.

As indicated above, the incoming speed should be 125±5 fps but corrected to 125 fps. The correlation between COR and forward or incoming speed has been studied and a correction has been made over the ±5 fps range so that the COR is reported as if the ball had an incoming speed of exactly 125.0 fps.

The coefficient of restitution must be carefully controlled in all commercial golf balls if the ball is to be within the specifications regulated by the United States Golf Association (U.S.G.A.). As mentioned to some degree above, the U.S.G.A. standards indicate that a "regulation" ball cannot have an initial velocity exceeding 255 feet per second in an atmosphere of 75° F. when tested on a U.S.G.A. machine. Since the coefficient of restitution of a ball is related to the ball's initial velocity, it is highly desirable to produce a ball having sufficiently high coefficient of restitution to closely approach the U.S.G.A. limit on initial velocity, while having an ample degree of softness (i.e., hardness) to produce enhanced playability (i.e., spin, etc.).

PGA compression is another important property involved in the performance of a golf ball. The compression of the ball can affect the playability of the ball on striking and the sound or "click" produced. Similarly, compression can affect the "feel" of the ball (i.e., hard or soft responsive feel), particularly in chipping and putting.

Moreover, while compression itself has little bearing on the distance performance of a ball, compression can affect the playability of the ball on striking. The degree of compression of a ball against the club face and the softness of the cover strongly influences the resultant spin rate. Typically, a softer cover will produce a higher spin rate than a harder cover. Additionally, a harder core will produce a higher spin rate than softer core. This is because at impact a hard core serves to compress the cover of the ball against the face of the club to a much greater degree than a soft core thereby resulting in more "grab" of the ball on the clubface and subsequent higher spin rates. In effect the cover is squeezed between the relatively incompressible core and clubhead. When a softer core is used, the cover is under much less compressive stress than when a harder core is used and therefore does not contact the clubface as intimately. This results in lower spin rates. The term "compression" utilized in the golf ball trade generally defines the overall deflection that a golf ball undergoes when subjected to a compressive load. For example, PGA compression indicates the amount of change in golf ball's shape upon striking.

In the past, PGA compression related to a scale of 0 to 200 given to a golf ball. The lower the PGA compression value, the softer the feel of the ball upon striking. In practice, tournament quality balls have compression ratings around 70–110, preferably around 80 to 100.

In determining PGA compression using the 0–200 scale, a standard force is applied to the external surface of the ball. A ball which exhibits no deflection (0.0 inches in deflection) is rated 200 and a ball which deflects $\frac{2}{10}^{th}$ of an inch (0.2 inches) is rated 0. Every change of 0.001 of an inch in deflection represents a 1 point drop in compression. Consequently, a ball which deflects 0.1 inches (100×0.001 inches) has a PGA compression value of 100 (i.e., 200–100) and a ball which deflects 0.110 inches (110×0.001 inches) has a PGA compression of 90 (i.e., 200–110).

In order to assist in the determination of compression, several devices have been employed by the industry. For example, PGA compression in determined by an apparatus fashioned in the form of a small press with an upper and lower anvil. The upper anvil is at rest against a 200-pound die spring, and the lower anvil is movable through 0.300 inches by means of a crank mechanism. In its open position the gap between the anvils is 1.780 inches allowing a clearance of 0.100 inches for insertion of the ball. As the lower anvil is raised by the crank, it compresses the ball against the upper anvil, such compression occurring during the last 0.200 inches of stroke of the lower anvil, the ball then loading the upper anvil which in turn loads the spring. The equilibrium point of the upper anvil is measured by a dial micrometer if the anvil is deflected by the ball more than 0.100 inches (less deflection is simply regarded as zero compression) and the reading on the micrometer dial is referred to as the compression of the ball. In practice, tournament quality balls have compression ratings around 80 to 100 which means that the upper anvil was deflected a total of 0.120 to 0.100 inches.

An example to determine PGA compression can be shown by utilizing a golf ball compression tester produced by Atti Engineering Corporation of Newark, N.J. The value obtained by this tester relates to an arbitrary value expressed by a number which may range from 0 to 100, although a value of 200 can be measured as indicated by two revolutions of the dial indicator on the apparatus. The value obtained defines the deflection that a golf ball undergoes when subjected to compressive loading. The Atti test apparatus consists of a lower movable platform and an upper movable spring-loaded anvil. The dial indicator is mounted such that it measures the upward movement of the spring-loaded anvil. The golf ball to be tested is placed in the lower platform, which is then raised a fixed distance. The upper portion of the golf ball comes in contact with and exerts a pressure on the springloaded anvil. Depending upon the distance of the golf ball to be compressed, the upper anvil is forced upward against the spring.

Alternative devices have also been employed to determine compression. For example, Applicant also utilizes a modified Riehle Compression Machine originally produced by Riehle Bros. Testing Machine Company, Phil., Pa. to evaluate compression of the various components (i.e., cores, mantle cover balls, finished balls, etc.) of the golf balls. The Riehle compression device determines deformation in thousandths of an inch under a fixed initialized load of 200 pounds. Using such a device, a Riehle compression of 61 corresponds to a deflection under load of 0.061 inches.

Additionally, an approximate relationship between Riehle compression and PGA compression exists for balls of the same size. It has been determined by Applicant that Riehle compression corresponds to PGA compression by the general formula PGA compression =160−Riehle compression. Consequently, 80 Riehle compression corresponds to 80 PGA compression, 70 Riehle corresponds to 90 PGA compression, and 60 PGA compression corresponds to 100 PGA compression. For reporting purposes, Applicant's compression values are usually measured as Riehle compression and converted to PGA compression.

Furthermore, additional compression devices may also be utilized to monitor golf ball compression so long as the correlation to PGA compression is known. These devices have been designed, such as a Whitney Tester, to correlate or correspond to PGA compression through a set relationship or formula.

As used herein, "Shore D hardness" of a cover is measured generally in accordance with ASTM D-2240, except the measurements are made on the curved surface of a molded cover, rather than on a plaque. Furthermore, the Shore D hardness of the cover is measured while the cover remains over the core. When a hardness measurement is made on a dimpled cover, Shore D hardness is measured at a land area of the dimpled cover.

In describing the components of the subject golf ball herein, the term "spherical" is used in conjunction with the shell (center). It is understood by those skilled in the art that when referring to golf balls and their components, the term "spherical" includes surfaces and shapes which may have minor insubstantial deviations from the perfect ideal geometric spherical shape. In addition the inclusion of dimples on the exterior surface of the shell, to effect its aerodynamic properties, does not detract from its "spherical" shape for the purposes therein or in the art. Further the internal surface of the shell as well as the core may likewise incorporate intentionally designed patterns and still be considered "spherical" within the scope of this invention.

The rotational moment of inertia of a golf ball is the resistance to change in spin of the ball and is conventionally measured using an "Inertia Dynamics Moment of Inertia Measuring Instrument".

Further scope of the applicability of the present invention will become apparent from the detailed description given hereinafter. It should, however, be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The following is a brief description of the drawings which are present for the purpose of illustrating the invention and not for purposes of limiting the same.

DETAILED DESCRIPTION OF THE PREFERRED EMBODIMENTS

The present invention relates to the development of a golf ball having a low spin rate as a result of combining a relatively soft core and a hard cover. Such a lower spin rate after club impact contributes to straighter shots when the ball is mis-hit, greater efficiency in flight, and a lesser degree of energy loss on impact with the ground, adding increased roll or distance.

The present invention is also directed to golf balls comprising one or more silicone interior layers and/or a silicone core. The golf balls of the present invention preferably utilize a multi-layer cover as described herein.

In addition, by increasing the diameter of the overall ball of the present invention beyond the U.S.G.A. minimum of 1.680 inches, the spin rate is still further decreased. In this embodiment of the invention, the ball, even though of larger diameter, uses substantially the same size core as a standard golf ball, the difference in size is provided by the additional thickness in the cover of the ball. This larger, low spin ball produces even greater control and flight efficiency than the standard size ball embodiment of the present invention.

Notwithstanding the overall size differences of the various embodiments of the present invention, the core of the present invention is relatively soft and of similar size. It has a Riehle compression of about 75 (0.075) or more, preferably about 75 (0.075) to about 160 (0.160), and a relatively low PGA compression of about 0 to 85, preferably about 10–70.

Figure 1:
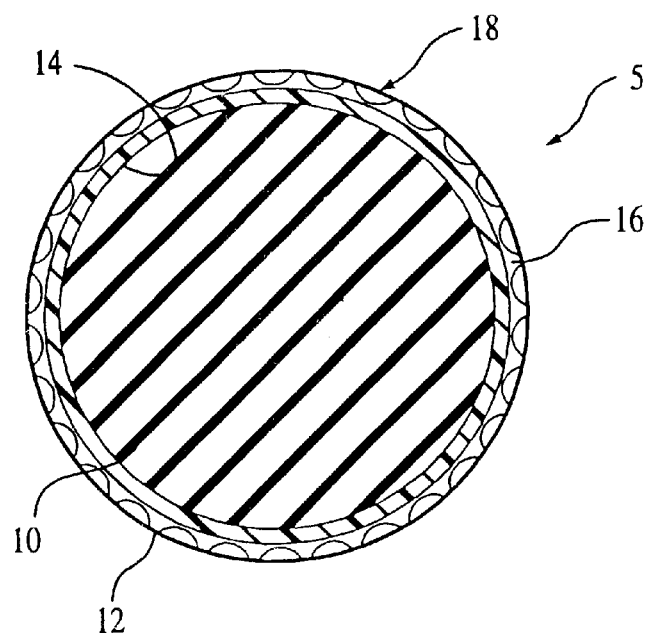
FIG. 1 is a cross-sectional view of a preferred embodiment golf ball in accordance with the present invention comprising a core and a cover having-an inner layer and an outer dimpled layer.
Figure 2:
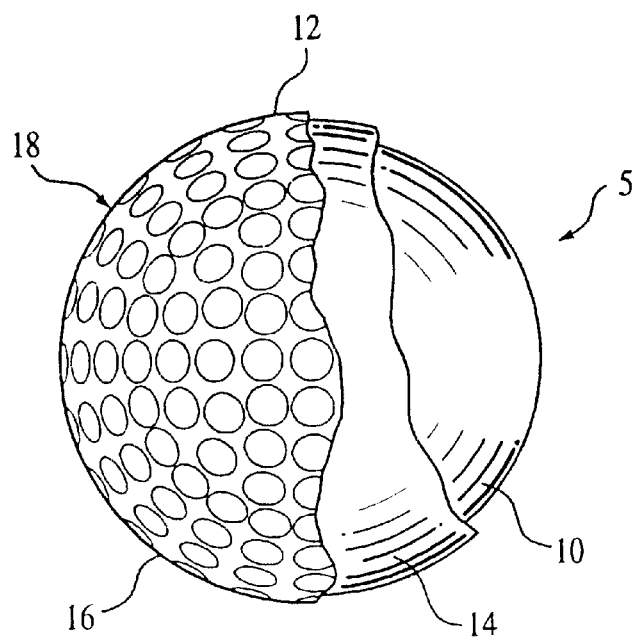
FIG. 2 is a diametrical cross-sectional view of the golf ball illustrated in FIG. 1 having a core and a cover comprising an inner layer and an outer layer having dimples.

FIGS. 1 and 2 illustrate a preferred embodiment golf ball 5 in accordance with the present invention. The golf ball 5 comprises a relatively hard multi-layered cover 12 disposed about a relatively soft solid core 10. The present invention also provides a. method for making such golf balls. It will be understood that the referenced figures, i.e. FIGS. 1–8, are not to scale. And so, thicknesses of the various layers may be less (or greater) than illustrated in the figures.

The multi-layered cover 12 comprises two layers: a first or inner cover layer or ply 14 and a second or outer cover layer or ply 16. The outer layer 16 defines a plurality of dimples 18. The inner layer 14 may be comprised of a high acid (i.e. greater than 16 weight percent acid) ionomer resin or high acid ionomer blend. Preferably, the inner layer is comprised of a blend of two or more high acid (i.e. at least 16 weight percent acid) ionomer resins neutralized to various extents by different metal cations. The inner cover layer may or may not include a metal stearate (e.g., zinc stearate) or other metal fatty acid salt. The primary purpose of the metal stearate or other metal fatty acid slat is to lower the cost of production without affecting the overall performance of the finished golf ball.

Silicone Interior Layers and/or Core

The present invention golf ball as previously noted, comprises one or more interior layers comprising one or more silicone compositions. The present invention golf ball may also, in addition to these silicone interior layers, comprise a core or core layer(s) comprising one or more silicone materials. The terms "silicone composition" and "silicone material" as used herein are interchangeable for purposes of this patent and comprise silicone polymers, silicone fluids, silicone elastomers, and silicone resins, each of which are described in detail below. It will be understood that these various silicone materials are distinguishable from silica, as is used as a filler agent, as described in U.S. Pat. Nos. 5,387,637; 3,756,607; and 2,764,572, all of which are herein incorporated by reference.

The term silicone as referred to herein denotes a synthetic polymer $(R_nSiO_{(4-n)/2})_m$, where n=1–3 and m≧2. A silicone contains a repeating silicon-oxygen backbone and has organic groups R attached to a significant proportion of the silicon atoms by silicon-carbon bonds. In commercially available silicones, most R groups are methyl, longer alkyl, fluoroalkyl, phenyl, vinyl, and a few other groups are substituted for specific purposes. Some of the R groups can also be hydrogen, chlorine, alkoxy, acyloxy, or alkylamino, etc. These polymers can be combined with fillers, additives, and solvents to result in products generally termed as silicones.

Silicones have an unusual array of properties. Chief among these are thermal and oxidative stability and physical properties that are minimally affected by temperature. Other important characteristics include a high degree of chemical inertness, and resistance to weathering. These features are such that silicone materials are well suited for incorporation into golf balls in accordance with the present invention. The molecular structure of suitable silicones can vary considerably to include linear, branched, and cross-linked structures.

Like carbon, silicon has the capability of forming covalent compounds. Silicon hyrides (silanes) up to $Si_6H_{14}$ are known. The Si—Si chain becomes thermally unstable at about this length, however, so that polymeric silanes are unknown. The siloxane link:

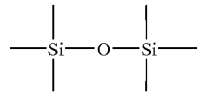

is more stable, and is the one predominantly found in commercial silicone polymers. Unlike carbon, silicon does not form double or triple bonds. Thus silicone polymers are usually formed only by condensation-type reactions.

Silicone polymers are made from organosilicon intermediates prepared in various ways from elemental silicon, which is typically produced by reducing quartz in an electric furnace.

The intermediate "monomers" of silicone polymers are compounds of the type $S_iR_nX_{4-n}$ where R is an alkyl or aryl group and X is a group which can be hydrolyzed to —SiOH, such as chlorine or alkoxy. The intermediates are generally made by a direct synthesis in which the R and X groups are attached simultaneously to the silicon by a high-temperature reaction of a halide with silicon in the presence of a metal catalyst. The chief reaction is, for example, $$2CH_3Cl+Si\rightarrow Si(CH_3)_2Cl_2$$

but a number of side reactions may occur.

Silicone polymers are typically produced by intermolecular condensation of silanols, which are formed from the halide or alkoxy intermediates by hydrolysis:

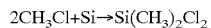

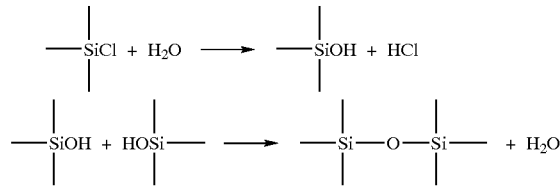

The desired siloxane structure is obtained by using silanols of different functionality, the alkyl R groups in the intermediate being unreactive.

The three commercially important classes of silicone polymers for use in the preferred embodiment golf balls include silicone homopolymers, silicone random copolymers, and silicone-organic (block) copolymers. Polydimethylsiloxanes (PDMS) constitute by far the largest volume of homopolymers commercially produced:

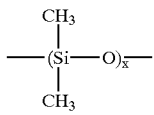

PDMS is usually the principal component of the random copolymers and the principal siloxane component of most silicone-organic copolymers.

The most common silicones are the trimethylsiloxy-terminated polydimethylsiloxanes. These polymers, as well as variations with silanol, vinyl, or hydride end groups, form the building blocks of many silicone fluid-based products and of most cured silicone elastomers. The properties of polydimethylsiloxanes are typically modified by substitution of methyl groups on the silicon atom by hydrogen, alkyl, phenyl, or organofunctional groups.

Silicone fluids are low polymers typically produced by the hydrolysis reaction mentioned above, in which a predetermined mixture of chlorosilanes is fed into water with agitation. In many cases, the cyclic tetramer predominates in the resulting mixture. Many silicone fluids are manufactured commercially, including dimethyl, methylalkyl, and dimethyl-diphenyl copolymers and silicone-polyether copolymers. These compounds are typically used as cooling and dielectric fluids, in polishes and waxes, as release and antifoam agents, and for paper and textile treatment. In view of their relatively low viscosity and fluid nature, these compounds are less preferred for use as the silicone materials in the present invention as compared to silicone polymers, and as described below, silicone elastomers and silicone resins. However, it is contemplated that silicone fluids may be utilized in the present invention golf balls.

Silicone elastomers are high-molecular-weight linear polymers, usually polydimethysiloxanes. Cross-linking silicone polymers of appropriate molecular weight provides elastomeric properties. Fillers increase strength through reinforcement, and extending fillers and additives, e.g. antioxidants, adhesion promoters, and pigments, can be utilized to provide specific properties.

Many curing (cross-linking) systems have been developed commercially for silicone elastomers. Different commercially available silicone elastomers are conveniently distinguished by their cure system chemistries and can be categorized by the temperature conditions needed for proper cure. Most compositions are based on polydimethylsiloxanes:

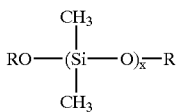

R is determined by the cure system chemistry. It can be hydrogen, an organic radical, or a silyl radical. The silyl radicals can contain single or multiple reactive groups like vinyl or alkoxy. Small amounts of reactive functionality are sometimes present in the chain in (copolymerized) units such as $(CH_2CH)(CH_3)SiO$. The value of x varies mainly with the type of product. For room-temperature-vulcanizing RTV products, x is in the 200–1,500 range; for heat-cured products, x is approximately 3,000–11,000.

Silicone elastomers can be cured in several ways:
a. By free-radical crosslinking with, for example, benzoyl peroxide, through the formation of ethylenic bridges between chains;
b. By crosslinking of vinyl or allyl groups attached to silicon through reaction with silylhydride groups:

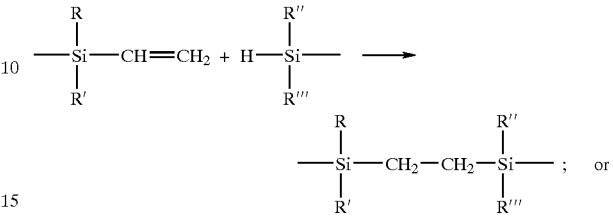

c. By crosslinking linear or slightly branched siloxane chains having reactive-end groups such as silanols. In contrast to the above reactions, this yields Si—O—Si crosslinks.

The latter mechanism forms the basis of the curing of room-temperature vulcanizing (RTV) silicone elastomers. These are available as two-part mixtures in which all three essential ingredients for the cure (silanol-terminated polymer, cross-linking agent such as ethyl silicate, and catalyst such as a tin soap) are combined at the time the two components are mixed, and as one-part materials using a hydrolyzable polyfunctional silane or siloxane as crosslinker, activated by atmospheric moisture.

Silicone elastomers are preferably reinforced by a finely divided material such as silica to more readily achieve properties for the silicone material as utilized in the interior layer(s) or core. Specifically, the reinforcing fillers for silicone elastomers may be finely divided silicas made by fume or wet processes. The fume process provides the highest degree of reinforcement. Accordingly, the particle size is small. The particle diameter should be about the length of a fully extended polymer chain, i.e., about 1 $\mu$m, for semireinforcement and about 0.01–0.05 $\mu$m for strong reinforcement. Fine particle size does not necessarily provide good reinforcement because finely divided fillers tend to agglomerate and are hard to disperse. This tendency can be countered by treating the filler to give it an organic or a silicone coating before mixing it with polymer. Hexamethyldisilazane, $[(CH_3)_3Si]_2NH$, is sometimes used as a coupling agent. Treating the silica particles with hot vapors of low molecular weight cyclic siloxanes reduces agglomeration and prevents premature crepe hardening.

Nonreinforcing fillers, such as iron oxide or titanium dioxide, may be utilized to stabilize or color the resulting silicone material or to decrease the cost per unit volume.

Thus fillers of many different chemical compositions with a broad range of particle sizes and physical properties are suitable for use with silicone elastomers when utilized in the present invention golf balls. The particular filler(s) selected primarily depend upon the desired end use properties of the silicone material in the golf balls. The mechanism of reinforcement has not been unequivocally determined and may indeed vary from one filler or polymer type to another. However, particle size is of prime importance for the strength of the elastomer compound after cure. Effective reinforcement is generally provided by silica particles having a specific gravity of about 2 and a range of about 20–400 $m^2/g$ specific surface area.

Nonreinforcing fillers may also be used merely as extenders. The particle size of such fillers ranges from submicrometer to about 10 $\mu$m. These fillers may not improve physical properties, but can be incorporated in significant amounts without adversely affecting strength of the resulting silicone material. Manufacture of these extenders does not require the specialized technology necessary for extremely fine particle fillers, but the selected extenders must meet rigorous requirements of thermal stability, low volatile content, and chemical purity.

Silicone elastomers differ in several important ways from most organic elastomers. The most striking difference is the degree to which the strength of the final compound depends on the reinforcement conferred by the incorporation of fillers. Typical unfilled silicone gums, when cross-linked, are weak and soft, with tensile strengths on the order of 0.34 MPa (50 psi). Compounding with suitably reinforcing fillers may increase the tensile strength as much as 50-fold. The selection of the filler is therefore extremely important for applications where strength is required. These differences in polymer-filler interactions and physical property requirements make fillers suitable for silicone elastomers different from those used for natural and synthetic rubber compounding.

The preferred filler types for silicone compounds used in the present invention golf balls include finely divided silicas prepared by vapor-phase hydrolysis or oxidation of chlorosilanes, dehydrated silica gels, precipitated silicas, diatomaceous silicas, and finely ground high assay natural silicas; fumed titania, alumina, and zirconia. Pigment-grade oxides especially ferric oxides, are extensively used as fillers for high temperature compounds in oxidizing environments. The iron oxide stabilizes the polymer against atmospheric oxidation and preserves the elastomeric characteristics, especially resilience and deformability, after exposure to temperatures above 300° C. Carbon blacks have had limited application because of their high content of adsorbed volatiles, which can lead to void formation during cure. Other types of fillers include calcium carbonate, clays, siicates, and aluminates. Fibrous fillers improve tear resistance at the expense of elongation, and hollow glass or plastic microspheres reduce the specific gravity. Fillers and their effects on heat-cured rubber properties are shown in Table 1, below.

TABLE 1

Fillers Suitable for Silicone Polymers

| Filler | Particle Size | | Reinforcement produced in silicone gums | |
|---|---|---|---|---|
| | Mean Diameter, $\mu$m | Surface Area, $m^2/g$ | Tensile Strength, MPa | Elongation, % |
| Reinforcing | | | | |
| fumed silica | 0.03 | silica aerogel | 4.1–6.9 | 200–350 |
| acetylene black | 0.015–0.02 | 110–150 | 4.1–12.4 | 200–600 |
| Semireinforcing and non-reinforcing | 0.045 | 175–200 78–85 | 4.1–6.2 | 200–350 |
| flux-calcined diatomaceous silica | 1.5 | | 2.7–5.5 | 75–200 |
| | 1–5 | <5 | 2.7–5.5 | 75–200 |
| calcined diatomaceous silica | 1–5 | <5 | 2.7–5.5 | 75–200 |
| calcined kaolin | 0.03–0.05 | <5 | 2.7–4.1 | 100–300 |
| predpitated calcium carbonate | 5–10 | 32 | 0.7–2.8 | 200–300 |
| ground silica | 1–10 | | 0.7–2.8 | 200–300 |
| ground silica | 5 | | 0.7–2.8 | 200–300 |
| ground silica | 0.3 | | 1.4–3.5 | 100–300 |

TABLE 1-continued

Fillers Suitable for Silicone Polymers

| Filler | Particle Size | | Reinforcement produced in silicone gums | |
|---|---|---|---|---|
| | Mean Diameter, $\mu$m | Surface Area, $m^2/g$ | Tensile Strength, MPa | Elongation, % |
| zinc oxide | <1 | 3.0 | 1.4–3.5 | 100–300 |
| iron oxide | | | 2.8–4.1 | 100–300 |
| zirconium silicate | 0.3 | | 1.4–3.5 | 300–400 |
| titanium dioxide | | | | |

Some silica or other oxide-filled silicone elastomers tend to "structure," i.e., to form an elastic mass before cure, impeding normal processing operations such as molding and extrusion. Intensive working of the compound with a rubber mill or other mixer may be necessary to restore plasticity. To minimize this tendency, plasticizers and process aids may be incorporated into the compounds. The most commonly used additives are monomeric or oligomeric organosilicon compounds. High surface silica filler is treated with a silicon derivative to minimize the buildup of structure. The structuring tendency is associated with hydrogen bonding between the siloxane polymers and silanol groups on the filler surface. The extent of hydrogen bonding is a function of the concentration of surface silanol and varies with the type and method of preparation of the filler. Surface-silanol concentration can be related to the total surface area as determined by absorption methods. Sufficient treating agent can be added to react completely with or be hydrogen bonded to the silanol groups present and yield a nonstructuring rubber compound. In an early method, the filler is treated with chlorosilanes or other reactive silanes, and the HCl or other reaction products are removed by purging the filler mass with an inert gas. Cyclic siloxane oligomers may be used to treat filler for silicone elastomers.

The extremely high surface silicas used as fillers present the same storage and handling problems as conventional fluffy carbon blacks. Typical bulk densities for fumed silicas typically range from about 32 to about 80 kg/m³. They can be increased to 160–240 kg/m³ by mechanical compaction and deaeration.

Oligomers of polydimethylsiloxane can be polymerized in the presence of fillers. Uncatalyzed base compounds for both RTV and heat-curing elastomers can be made in this way. However, optimal properties still depend on conventional compounding.

Related to silicone elastomers, room temperature vulcanizing (RTV) silicone elastomers are often available as uncured rubbers with liquid or paste like consistencies. They are based on polymers of intermediate molecular weights and viscosities, e.g., 100–1,000,000 mm²/s at 25° C. Curing is based on chemical reactions that increase molecular weights and provide cross-linking. Catalysts may be utilized to ensure cure control. The RTV silicone rubbers are typically available in two modifications. The cure reactions of one-component products are triggered by exposure to atmospheric moisture. Those of two-component products are triggered by mixing the two components, one of which consists of or contains the catalyst.

Commercially available one-component RTV rubbers are typically made by mixing polymers, fillers, additives, curing agents, and catalysts. The mixture is packaged to protect it from moisture, which may trigger cure. The time required for cure depends on the curing system, temperature, humidity, and thickness of the silicone layer or core component. Under typical ambient conditions the surface can be tack free in about 30 minutes, while a 0.3-cm thick layer cures in less than one day. As cure progresses, strength develops slowly for about three weeks.

The original viscosity of these RTV materials depends principally on that of the polymer components and the filler loading. Filler and original polymer properties and cross-link density affect the ultimate strength of the fully cured elastomer. Most commercially available products are based on polydimethylsiloxanes. Polymers with substituents other than methyl modify and improve certain properties; e.g., trifluoropropyl groups improve solvent resistance. Some products are compounded with fillers and additives to be pourable, and others to be thixotropic. Silica-filled polydimethylsiloxane systems, lacking pigments and other additives, cure to form translucent rubbers. Since the specific gravity of silicas, generally about 2.2, exceeds that of siloxanes, generally about 1.0, the specific gravity of the RTV rubbers depends on the filler loading. Physical properties of similar cured acetoxy RTV formulations are shown in Table 2.

TABLE 2

Physical Properties of RTV Rubbers

| Specific Gravity[1] | Durometer Hardness, Shore A | Tensile Strength, MPa | Elongation, % |
|---|---|---|---|
| 1.18 | 45 | 2.4 | 180 |
| 1.30 | 50 | 3.1 | 140 |
| 1.33 | 50 | 3.4 | 200 |
| 1.37 | 55 | 3.8 | 120 |
| 1.45 | 60 | 4.5 | 110 |
| 1.45 | 60 | 5.2 | 160 |
| 1.48 | 65 | 4.8 | 110 |

[1]With increasing filler loading.

Formulations with different curing systems, polymer molecular weights and structures, cross-link densities, and other characteristics offer a broad spectrum of product properties. For example, one-component products are available with elongations as high as 1000%. Typical properties of representative cured RTV silicone rubbers are shown in Tables 3 and 4.

TABLE 3

Thermal Properties of Cured Silicone Elastomers

| | One Component | | Two Components | |
|---|---|---|---|---|
| Property | General Purpose | Construction Sealant | Adhesive Sealant | Molding Comopound |
| Hardness, Shore A, durometer | 30 | 22 | 50 | 60 |
| Tensile Strength, MPa | 2.4 | 1.0 | 3.4 | 5.5 |
| Elongation, % | 400 | 850 | 200 | 220 |
| Tear Strength, J/cm$^2$ | 0.80 | 0.35 | 0.52 | 1.75 |

TABLE 4

Thermal Properties of Cured Silicone Elastomers

| Property | Typical Range |
|---|---|
| Useful temperature range, ° C. | −110 to 200 |
| with thermal stabilizers | −110 to 250 |
| Thermal conductivity, W/(m-K) | 1.7–3.4 |
| Coefficient of thermal expansion, per ° C. | 3.5 × 10$^{-5}$ |

The one-component RTV silicone rubbers are in some instances, preferred for use in the present invention golf balls, particularly for one or more interior layers. Such layers may be formed by encapsulating the core with an RTV silicone rubber material. Many formulations provide self-bonding to most metals, glass, ceramics, concrete, and plastics. For example, bonds to aluminum with >1.38 MPa (200 psi) shear strength and 0.35 J/cm$^2$ (20 lbf/in.) tear strength are obtainable. Bonding can be improved by applying a primer to the substrate. These primers are solutions of reactive silanes or resins that dry (cure) on the substrate, leaving a modified silicone bondable surface. Bond strength develops as the RTV cure progresses.

The two-component RTV silicone rubbers are commercially available in a wide range of initial viscosities, from as low as an easily pourable 100-mm$^2$/s material to as high as the stiff paste like materials of over 1,000,000 mm$^2$/s at 25° C. Curing system, polymer molecular weight and structure, cross-link density, filler, and additives can be varied and combined, giving a group of products whose properties cover a wider range than that encompassed by the one-component products. The highest strength RTV rubbers are provided by two-component RTV technology. On the other hand, products that cure to a mere gel are also available. Unfilled resin-reinforced compositions can provide optical clarity. Polymers with phenyl, trifluoropropyl, cyanoethyl, or other substituents can be used with, or in place of, polydimethylsiloxanes for low temperature-, heat-, radiation-, and solvent-resistant elastomers.

In one-component formulations that rely for cure on the reaction between a reactive cross-linking agent and atmospheric moisture, the ingredients must be thoroughly dried, or a drying step must be included in the compounding cycle. As more filler is added during compounding, the resistance to mixing tends to peak until "wetting-in" is reached. The moisture-sensitive cross-linking agent is usually added last. However, this step can be performed separately. When the uncatalyzed base compound and cross-linking agent are mixed, the effective viscosity sometimes passes through a maximum. As the early chemical interactions are resolved, a typical consistency is obtained. Allowance for elevated effective in-process viscosities must be made when mixing equipment is specified. Silica-reinforced uncatalyzed base compounds harden (develop structure) on storage, and the addition of catalyst should not be delayed.

For two-component formulations, each part may contain varying proportions of filler and polymer. The second part contains the curing catalyst and possibly the cross-linking agent and pigments. By proper design of the compound, the proportions of first and second parts to be used may be adjusted for-convenient handling and metering. Typically, from about 1 to 20 parts of the first part are typically used per part of the second.

Many commercially available two-component RTV elastomers can be advantageously cured at 50–150° C., depending on the product and intended use, but RTV is characteristic. Hydrosilation-curing RTV compositions can be modified with inhibitors to become heat-curing systems.

Unlike RTV compositions, most heat-curing silicone rubbers are based on high molecular weight polymer gums. Gums, fillers, and additives can be mixed in dough mixers or Banbury mills. Catalysts are added on water-cooled rubber mills, which can be used for the complete process in small-scale operations.

Silicone rubbers are commercially available as gums, filler-reinforced gums, dispersions, and uncatalyzed and catalyzed compounds. Dispersions or pastes may be stirred with solvents such as xylene. The following types of gums are commercially available: general purpose (methyl and vinyl), high and low temperature (phenyl, methyl, and vinyl), low compression set (methyl and vinyl), low shrink (devolatilized), and solvent resistant (fluorosilicone); properties are shown in Table 15.

The tensile strength of cured dimethylsilicone rubber gum is only about 0.34 MPa (50 psi). Finely divided silicas are used for reinforcement. Other common fillers include mined silica, titanium dioxide, calcium carbonate, and iron (III) oxide. Crystallizing segments incorporated into the polymer also serve as reinforcement. For example, block copolymers containing silphenylene segments, $\{(CH_3)_2SiC_6H_4Si(CH_3)_2O\}_{\overline{n}}$, may have cured gum tensile strengths of 6.8–18.6 MPa (1000–2700 psi). See Table 5.

TABLE 5

Properties of Silicone Gums

| Type | Density $d^{25}$, g/cm$^3$ | $T_g$, °C. | Williams Plasticity (ASTM D926) |
|---|---|---|---|
| $(CH_3)_2SiO$ | 0.98 | –123 | 95–125 |
| $CH_3(C_6H_5)SiO$ | 0.98 | –113 | 135–180 |
| $CH_3(CF_3CH_2CH_2)SiO$ | 1.25 | –65 | |

Consistencies of uncured rubber mixtures rang from a tough putty to a hard deformable plastic. Those containing reinforcing fillers tend to stiffen, i.e., develop structure, on storage. Additives, such as water, diphenylsilanediol, dimethylpinacoxysilane, or silicone fluids, inhibit stiffening.

The properties of fabricated rubber depend on the gum, filler, catalyst, additives, and solvents and their proportions. A high filler content increases hardness and solvent resistance and reduces elongation. The properties also depend on the thoroughness of mixing and the degree of wetting of the filler by the gum. The properties change as cure progresses and are stabilized by devolatilization. The properties may also be affected by the environment and aging.

Before being used, silicone rubber mixtures are preferably freshened. Catalyst is added, and the mixture is freshly milled on rubber mills until the components band into smooth continuous sheets that are easily worked. Specific or custom mixtures are prepared by suppliers for particular product applications. A formula is designed to achieve some special operating or processing requirement, and formulations are classified accordingly as set forth below in Table 6.

Silicone rubbers are cured by several mechanisms. For hydrosilation cure, high molecular weight polymers (gums) with vinyl functionality are combined with fluid hydride-functional cross-linking agents. The catalyst, such as a soluble platinum compound, is added with an inhibitor to prevent cure initiation before heating.

Silicone rubber is usually cured by heating the reinforced polymer with a free-radical generator, e.g., benzoyl peroxide.

Cure is also effected by gamma or high energy electron radiation, which causes scission of all types of bonds, including Si—O; the important cure reactions and those involving Si—C and C—H. Hydrogen, methane, and ethane evolve, and bridges between chains are formed by recombination of the radicals generated. These bridges include Si—CH$_2$—Si$_1$Si—Si, and perhaps Si—CH$_2$CH$_2$—Si. An absorbed dose of 770–1300 C/kg (3×10$^6$ to 5×10$^6$ roentgen) is typically required for effective cure. Radiation cure can be used for thick sections, but high energy electrons penetrate to a depth of only a few millimeters.

Freshly mixed silicone rubber compounds are usually molded at 100–180° C. and 5.5–10.3 MPa (800–1500 psi). Under these conditions, thermal cure can be completed in minutes. The molds are usually lubricated with a 1–2 wt % aqueous solution of a household detergent. Final properties can be developed by oven curing or by continuous steam vulcanization.

For bonding silicone rubber to other materials, such as an interior layer or core in the golf balls of the present invention, primers are preferably used, including silicate esters, silicone pastes, silicone resins, or reactive silanes. After evaporation of solvent and setting or cure of the primed surface, the rubber compounds are applied and cured under pressure. Self-bonding silicone rubber stocks require no primer.

Silicone rubber is compounded in dough mixers, Banbury mixers, two-roll rubber mills, various types of change-can mixers, and continuous compounders. Large vertical Banbury mixer systems are used for high volume semicontinuous production of dry (but not overly tacky) compounds; tackiness can create problems in unloading. The basic process requirements are similar in nearly all applications: addition of gums, fillers, process aids, pigments, and catalysts in the prescribed order; breakdown of agglomerates in the fillers; uniform dispersion of filler in the gum; and control of temperature and, in some. cases, pressure for retention or removal of volatile ingredients and prevention of premature cure.

The properties of cured silicone elastomers are temperature dependent. For example, Young's modulus decreases from about 10,000 to 200 MPa (145×10$^4$ to 2.9×10$^4$ psi) between –50 and 25° C. and remains fairly constant to 260° C. Tensile strength decreases from approximately 6.9 MPa (1000 psi) at 0° C. to 2.1 MPa (300 psi) at 300° C. The

TABLE 6

Properties of Silicone Rubber Classes

| Class | Hardness, Durometer | Tensile Strength, MPa | Elongation % | Compression set at 150° C. for 22 h, % | Useful Temperature Range, °C. Minimum | Useful Temperature Range, °C. Maximum | Tear Strength, J/cm$^2$ |
|---|---|---|---|---|---|---|---|
| General purpose | 40–80 | 4.8–7.0 | 100–400 | | –60 | 260 | |
| Low compression set | 50–80 | 4.8–7.0 | 80–400 | 15–50 | –60 | 260 | 0.9 |
| Extreme low temperature | 25–80 | 5.5–10.3 | 150–600 | 10–15 | –100 | 260 | 0.9 |
| Extreme high temperature | 40–80 | 4.8–7.6 | 200–500 | 20–50 | –60 | 315 | 3.1 |
| Wire and cable | 50–80 | 4.1–10.3 | 100–500 | 10–40 | –100 | 260 | |
| Solvent resistant | 50–60 | 5.8–7.0 | 170–225 | 20–50 | –68 | 232 | 1.3 |
| High strength flame retardant | 40–50 | 9.6–11.0 | 500–700 | 20–30 | | | 2.8–3.8 | thermal conductivity of silicone rubber is usually about 1.5–4 W/(m-K) and increases with increasing filler content.

Silicone rubber (gum) films are permeable to gases and hydrocarbons; they are about 10–20 times as permeable as organic polymers. Water diffuses through lightly cross-linked gum as monomer, dimer, and trimer with diffusion coefficients of 1.5, 3.6, and $3.1 \times 10^{-5}$, respectively, at 65° C. Silicone rubber compounds are also permeable to gases. Cross-linking and fillers reduce permeability.

Solvents diffuse into silicone rubber and swell, soften, and may result in weakening of the rubber. The degree of swelling depends on the solvent and has been correlated with the solubility parameters of solvent and rubber. The correlation is improved if electrostatic interactions are considered.

Silicone elastomers appear completely hydrophobic to liquid water. Aqueous solutions interact with silicone rubber with varying effects. Water itself has little effect, although at higher temperatures it causes softening and weakening. If the rubber is heated with water in a sealed environment, it is converted to a sticky polymer.

In contrast to the silicone fluids and elastomers, silicone resins contain Si atoms with no or only one organic substituent. They are therefore crosslinkable to harder and stiffer compounds than the elastomers, but many must be handled in solution to prevent premature cure. They are, in fact, usually made by hydrolysis of the desired chlorosilane blend in the presence of a solvent such as mineral spirits, butyl acetate, toluene, or xylene. These materials are usually cured with metal soaps or amines.

As noted, silicone resins are highly cross-linked siloxane systems. The cross-linking components are introduced as trifunctional or tetrafunctional silanes in the first stage of manufacture or processing. For example, a solution of $CH_3SiCl_3$, $(CH_3)_2SiCl_2$, $C_6H_5SiCl_3$, and $(C_6H_5)_2SiCl_2$ or $CH_3(C_6H_5)SiCl_2$ in toluene is hydrolyzed to form a complex copolymer mixture, which remains in solution in toluene. The aqueous hydrochloric acid is separated, and the resin solution is washed and heated in the presence of a mild condensation catalyst to adapt (body) the resin to the proper viscosity and cure time. It is finally adjusted to specifications by distilling or adding solvents. The properties of the resins depend on the choice of chlorosilanes, the degree of cure, and the processing conditions.

The chlorosilanes for a particular resin formulation determine its characteristics. Monomethyl-, dimethyl-, monophenyl-, diphenyl-, methyl-, phenyl-, monovinyl-, and methylvinylchlorosilanes, together with silicon tetrachloride, are typical chlorosilanes. Prediction of specific resin properties as a function of composition is difficult since processing and cure influence the final molecular configuration and related characteristics. However, some generalizations can be made: trifunctional siloxy units produce harder, less flexible resins, which are frequently immiscible with organic polymers; difunctional siloxy units increase softness and flexibility, and phenylsiloxanes are more miscible with organic polymers than methylsiloxanes and produce resins that are less brittle and have superior thermal resistance. Alkyl groups other than methyl also increase the compatibility with other organic materials. The effects of silanes on the properties of a film are shown in Table 7. Properties of these silanes vary considerably. Some resins are soft and flexible, and others are hard and glassy. Processing conditions vary from hydrolysis in strong acid to dilute acid or buffered aqueous systems. Alkoxysilanes can also be used to avoid acid conditions. Solvent, temperature, concentration, and-catalyst for bodying and curing affect the result.

TABLE 7

Effect of Silanes on the Properties of Silicone Resin Films

| Property | $CH_3SiCl_3$ | $C_6H_5SiCl_3$ | $(CH_3)_7SiCl_2$ | $(C_6H_5)_2SiCl_2$ | $CH_3(C_6H_5SiCl_2$ |
|---|---|---|---|---|---|
| Hardiness | increase | increase | decrease | decrease | decrease |
| Brittleness | increase | great increase | decrease | decrease | decrease |
| Stiffness | increase | increase | decrease | decrease | decrease |
| Toughness | increase | increase | decrease | decrease | decrease |
| Cure Speed | much faster | some increase | slower | much slower | slower |
| Tack | decrease | some decrease | increase | increase | increase |

Most silicone resin products require heat and catalysts for curing. During the life of the product, curing continues, and properties change with time. For this reason, silicone resins exhibiting this characteristic are generally less preferred than silicone elastomers and rubbers described herein.

Silicone resins are cured through the formation of siloxane linkages by the condensation of silanols. This is a continuation of the overall condensation process by which the resin is prepared. As condensation continues, the rate decreases because of lower silanol concentration, increased steric hindrance, and reduced mobility. For final cure, therefore, the reaction must be accelerated by heat and catalyst. Even so, some silanols remain, and slow cure continues for the life of the resin. The reaction is reversible, and water must be removed from the system to permit a high degree of cure. Many substances catalyze silanol condensation, including acids and bases; soluble organic salts of lead, cobalt, tin, iron, and other metals and organotin compounds, e.g., dibutyl tin dilaurate, or N,N,N',N'-tetramethylguanidine salts.

Silicone resins based on hydrosilation cure have also been developed. These materials cure by addition reactions and are similar in composition to hydrosilation-curing elastomers, however are generally more highly cross-linked.

Silicone resins change little on exposure to humidity, heat, and sunlight. Weather resistance is also exhibited by silicone-organic copolymers and blends, provided the silicone content is high enough.

A variety of commercially available silicone resins may be utilized in the preferred embodiment golf balls. For example, silicone resins can be obtained from Dow Coming Corp., Midland, Mich.; GE Silicones, Waterford, N.Y.; Gelest Inc., Tullytown, Pa.; Wacker Silicones, Adrian, Mich.; and Shin-Etsu Chemical Co., Ltd, Tokyo 100, Japan.

A particularly preferred commercial supplier of silicone resin is Shin-Etsu. Shin-Etsu offers a two-component, high strength molding compound under the designation KE 1300, that provides excellent resin resistance and will not shrink when cured at room temperature.

KE 1300 features high tear strength. It is ideal for intricate molds, or applications where tearing or ripping of a mold is a concern. KE 1300 is available in a T (translucent) and a white version. Properties and mold life will be the same with both. The translucent version (KE 1300T) is very useful for applications where visual sighting of the master or where identification of voids is needed. KE 1300T and KE 1300 (white) are preferred whenever resistance to attack by epoxies, polyesters and urethanes and high tear strength in a medium modulus material is required.

Whenever Catalyst 1300L-3 is used to cure KE 1300 or KE 1300T, a lower modulus material results without seriously effecting tear strength. This is appropriate for those applications where demolding is a problem due to deep undercuts or thick cross-sections.

Other suitable silicone resins available from Shin-Etsu are set forth below in Table 8. The noted KE 1402, SES 412, and KE 10 are all condensation cure products. The noted KE 1300T, KE 1300, KE 1310ST, KE 1310S, KE 1600, and KE 1604 are all addition cure products. These addition cure products can be heat accelerated if a faster cure is desired. For example, a heat cure for 2 hours at 60° C. can be performed at 1 hour at 85° C.

TABLE 8

General Characteristics of Commercially Available Silicone Compositions

| Product | Color | Description | Pot Life (Hrs) | Catalyst |
|---|---|---|---|---|
| KE 1402 | Pink | Low durometer, high strength inhibition resistant | 1.5 | CAT 1402 |
| SES 412 | White | Medium durometer, low viscosity, general purpose | 0.5 | CAT RM |
| KE 10 | Off-white | High durometer, low viscosity, general purpose | 1.0 | CAT RA |
| KE 1300T | Translucent | Low durometer, high strength | 1.5 | CAT 1300L-3 |
| KE 1300T | Translucent | Medium durometer, high strength | 1.5 | CAT 1300 |
| KE 1300 | White | Medium durometer, high strength, opaque | 1.5 | CAT 1300 |
| KE 1310ST | Translucent | Premium strength, longest mold life | 2.0 | CAT 1310 |
| KE 1310S | White | Premium strength, longest mold life, opaque | 2.0 | CAT 1310 |
| KE 1600 | Off-white | Medium durometer, general purpose | 2.0 | CAT 1300 |
| KE 1604 | Blue | High durometer, general purpose | 2.0 | CAT 1604 |
| KE 1604 | Off-white | High durometer, general purpose, neutral color | 2.0 | CAT 1604T |

Physical Properties of Commercially Available Silicone Compositions

| Product | Initial Mixed Viscosity (poise) | Hardness Durometer (Shore-A) | Tensile Strength (psi) | Elongation % | Linear Shrinkage (%) | Tear Strength (ppli) | Specific Gravity |
|---|---|---|---|---|---|---|---|
| KE 1402 | 600 | 25 | 600 | 400 | 0.4 | 120 | 1.10 |
| SES 412 | 100 | 40 | 355 | 160 | 0.2 | 45 | 1.30 |
| KE 10 | 300 | 55 | 480 | 150 | 0.1 | 45 | 1.15 |
| KE 1300T | 1000 | 30 | 630 | 400 | <0.1 | 110 | 1.11 |
| KE 1300T | 1000 | 40 | 800 | 300 | <0.1 | 125 | 1.11 |
| KE 1300 | 1000 | 40 | 800 | 300 | <0.1 | 125 | 1.11 |
| KE 1310ST | 840 | 40 | 850 | 340 | <0.1 | 140 | 1.07 |
| KE 1310S | 840 | 40 | 850 | 340 | <0.1 | 140 | 1.07 |
| KE 1600 | 1700 | 50 | 1000 | 200 | <0.1 | 80 | 1.26 |
| KE 1604 | 1000 | 60 | 1100 | 170 | <0.1 | 95 | 1.26 |
| KE 1604 | 1000 | 60 | 1100 | 170 | <0.1 | 95 | 1.26 |

Curing Properties of Commercially Available Silicone Resins

| Product | Base Curing Agent Ratio by WT. | Curing Hr/° C. |
|---|---|---|
| KE 1402 | 10:1 | 24/25 |
| SES 412 | 100:0.5 | 24/25 |
| KE 10 | 100:2.5 | 24/25 |
| KE 1300T | 10:1 | 24/25 |
| KE 1300T | 10:1 | 24/25 |
| KE 1300 | 10:1 | 24/25 |

TABLE 8-continued

| | | |
|---|---|---|
| KE 1310ST | 10:1 | 24/25 |
| KE 1310S | 10:1 | 24/25 |
| KE 1600 | 10:1 | 24/25 |
| KE 1604 | 10:1 | 24/25 |
| KE 1604 | 10:1 | 24/25 |

When utilizing a two part, addition cure, silicone resin, typical properties of the components and cured compositions are set forth below in Table 9 as follows:

TABLE 9

Typical Properties of Two Part, Silicone Resins

| | Part A | Part B | Mixed A/B |
|---|---|---|---|
| Appearance | Milky-White Translucent | Milky-White Translucent | Milky-White Translucent |
| Specific Gravity, @ 25° | 1.08 + 0.04 | 1.08 + 0.04 | 1.08 + 0.04 |
| Viscosity, @ 25° | 500–1,000 P | 1–50 P | 500 ± 250 P |
| Cured Properties (Cure Condition: 15 min. @ 150° C.): | | | |
| Hardness, Shore 00 | | | 70 ± 15 |
| Tensile Strength, psi | | | 450 ± 150 |
| Elongation, % | | | 500 ± 150 |

Preferably, the silicone material utilized in the preferred embodiment golf balls exhibits, upon curing, a Shore 00 hardness of from about 55 to about 100; a tensile strength of from about 300 psi to about 600 psi; and an elongation of from about 350% to about 650%.

Figure 3:
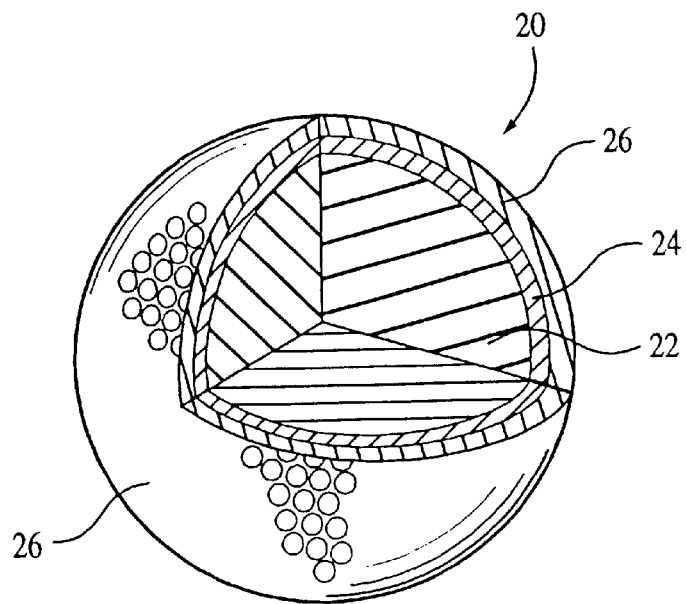
FIG. 3 is a partial cross-sectional view of another preferred embodiment golf ball in accordance with the present invention having an interior layer comprising a silicone material.

As noted, the present invention golf balls may comprise one or more interior layers comprising one or more silicone materials. Referring to FIG. 3, a preferred embodiment golf ball 20 is illustrated comprising a core 22 formed from a material as described herein, and an interior layer 24 formed from one or more silicone material(s). The interior layer 24 is disposed between the core 22 and an outer layer 26. The outer layer 26 may be in the form of the previously described multilayer cover 12.

Figure 4:
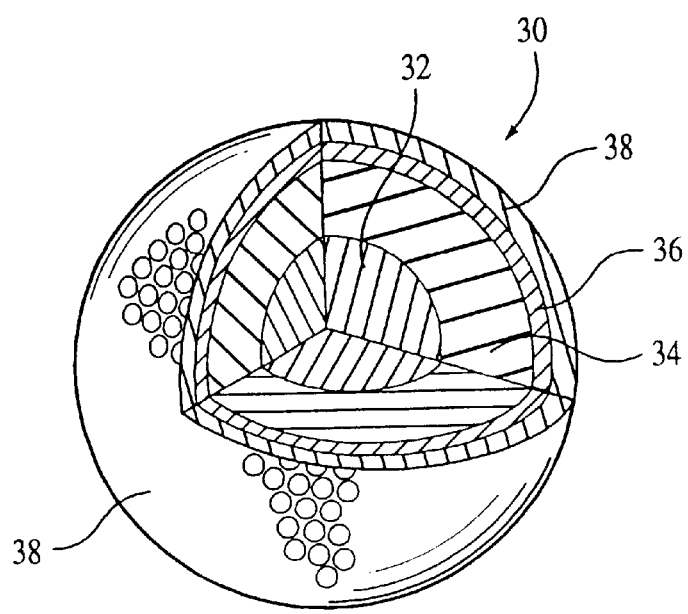
FIG. 4 is a partial cross-sectional view of another preferred embodiment golf ball in accordance with the present invention having two interior layers, at least one of which comprises a silicone material.

In another preferred embodiment, the present invention provides a golf ball 30 as shown in FIG. 4. The golf ball 30 comprises a core 32, formed from a material as described herein, and two inner layers, such as 34 and 36. Either or both of the inner layers 34 and 36 may be formed from a silicone material. The golf ball 30 may further comprise an outer layer 38 similar to the outermost multilayer cover 12.

Figure 5:
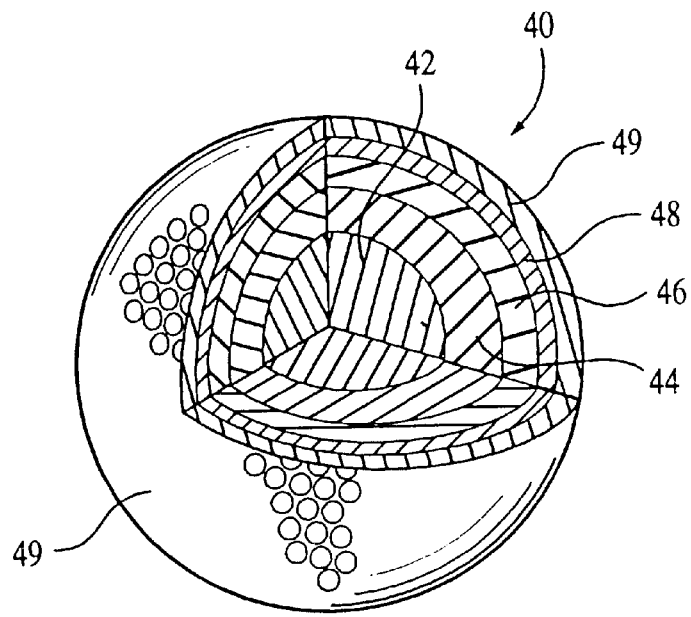
FIG. 5 is a partial cross-sectional view of yet another preferred embodiment golf ball in accordance with the present invention having three or more interior layers, at least one of which comprises a silicone material.

In yet another preferred embodiment, the present invention provides a golf ball 40 as shown in FIG. 5. The golf ball 40 comprises a core 42, formed from a material as described herein, and three or more inner layers such as layers 44, 46, and 48, that may be formed from a silicone material. The golf ball 40 may further comprise an outermost layer 49 similar to the previously described multilayer cover 12.

Although not-wishing to be bound to any particular dimensions, the present inventors have determined that the one or more silicone layers preferably have the following dimensions and characteristics. When utilized in conjunction with a core of at least about 1.20 inches in diameter or greater, the total thickness of the silicone layers is at least about 0.020 inches or greater. The golf balls, may utilize one or more silicone layers, however it is preferred to provide at least two or more. If the silicone layers are used in combination with one or more layers of a non-silicone composition, it is preferred that the thickness of the non-silicone layers be at least about 0.020 inches or greater. Examples of such non-silicone materials include, but are not limited to, relatively hard, resilient materials such as ionomers, nylons, thermoplastic urethanes, and hytrels for instance. The minimum total thickness of all layers within the preferred embodiment golf balls is about 0.040 inches. The preferred total thickness of all the silicone layers is about 0.050 inches.

As previously noted, the preferred embodiment golf balls of the present invention may further comprise a core comprising a silicone composition. Such material is preferably selected from the previously noted silicone materials. A particularly preferred core composition is based upon blends of ionomers as described herein and a commercially available silicone rubber, Dow Coming Silastic rubber WC-50. Silastic WC-50 comprises a low level of vinyl groups and has a specific gravity of about 1.15 and a brittleness temperature of about −39° C.

Figure 6:
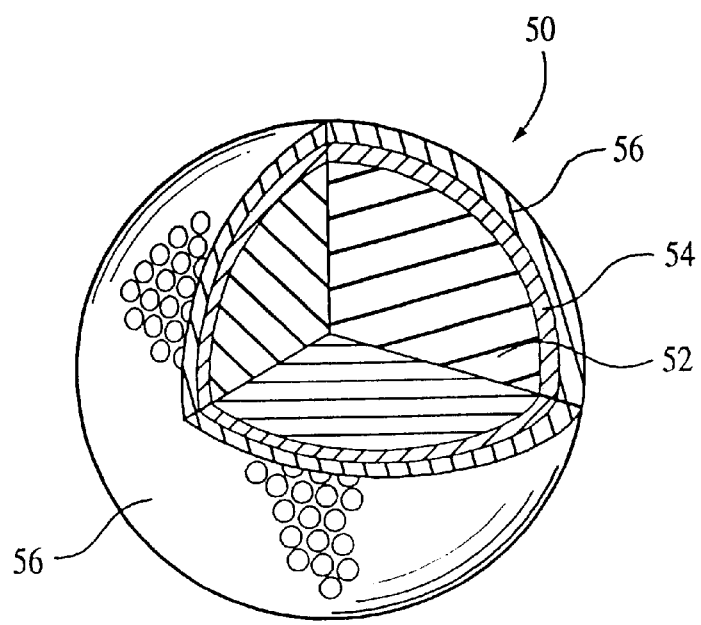
FIG. 6 is a partial cross-sectional view of another preferred embodiment golf ball in accordance with the present invention having a core comprising a silicone material.
Figure 7:
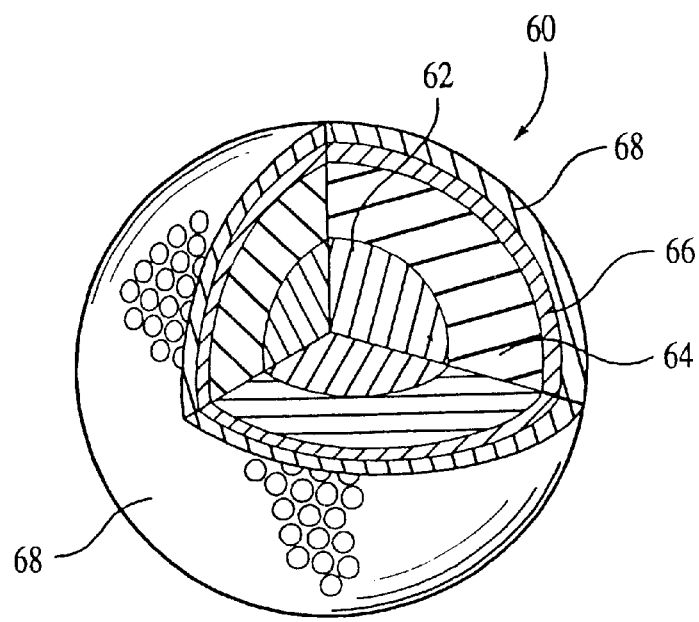
FIG. 7 is a partial cross-sectional view of another preferred embodiment golf ball in accordance with the present invention having a core comprising a silicone material and at least two interior layers.
Figure 8:
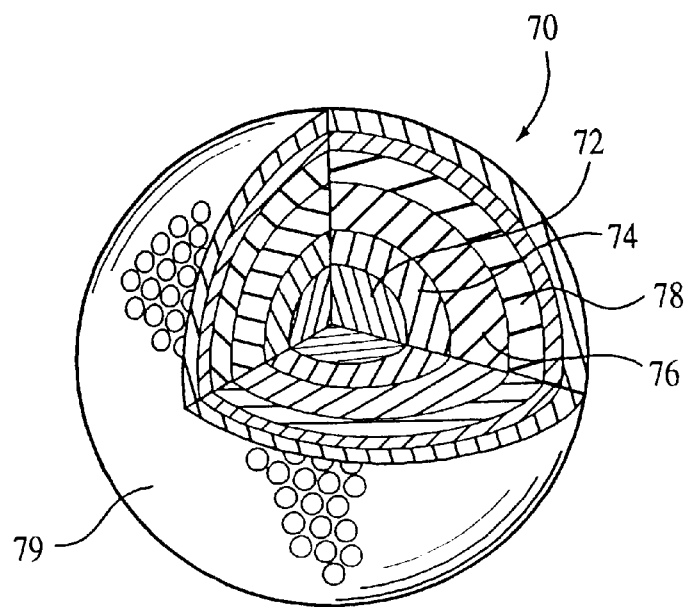
FIG. 8 is a partial cross-sectional view of yet another preferred embodiment golf ball in accordance with the present invention having a core comprising a silicone material and three or more interior layers.

Referring to FIGS. 6–8, several additional preferred embodiment golf balls are illustrated comprising cores including a silicone material and one or more inner layers comprising materials described herein.

FIG. 6 illustrates a preferred embodiment golf ball 50 comprising a core 52 including a silicone material, an inner layer 54, and an outer cover 56. The outer cover 56 may be in the form of the previously described multilayer cover 12.

The invention also provides another preferred embodiment golf ball 60 illustrated in FIG. 7 comprising a core 62 formed from a silicone material, a first inner layer 64, a second inner layer 66, and an outer cover 68. The outer cover 68 may be in the form of the previously described multilayer cover 12.

FIG. 8 depicts another preferred embodiment golf ball 70 comprising a core 72, a plurality of inner layers 74, 76, and 78, and an outer cover 79. The core 72 comprises a silicone material. The outer cover 79 may be in the form of the previously described multilayer cover 12.

The core has a preferred set of characteristics as follows. The silicone core is preferably from about 1.10 inches to about 1.60 inches in diameter. When utilizing a silicone composition core, the mantle (or one or more interior layers) thickness is from about 0.020 inches to about 0.145 inches. And, the cover thickness is from about 0.020 inches to about 0.145 inches. The ball diameter is preferably from about 1.68 inches to about 1.75 inches or more in diameter. When utilizing a silicone core, the golf ball preferably includes at least two or more layers. The mantle and/or cover layers may be formed from a relatively hard resilient materials such as for example, ionomers, nylons, polyurethanes, polyester elastomers, etc.

Moreover, the present invention provides golf balls having both a core formed from a silicone material and one or more inner layers formed from a silicone material. The configuration or structure of such balls may be as depicted in FIGS. 1–8.

As previously described with regard to silicone elastomers, it may, in some instances, be preferred to incorporate one or more filler agents in the one or more inner layers comprising silicone materials. It may also be desirable to incorporate such agents in a silicone core. Incorporating such agents may serve to reinforce that resulting silicone composite material, and/or alter other physical properties of the layer and/or core. The use of such agents may serve to increase, or in some cases, decrease, one or more of the following properties: hardness, strength, rigidity, elasticity, and density. With regard to increasing the density of a silicone material utilized in the present invention golf balls, it is particularly preferred to incorporate such agents, particularly those having a relatively high density, in a silicone layer in order to increase the weight and moment inertia of the ball.

Examples of suitable fillers and/or weighting agents include, but are not limited to, particulate silica; fumed silica; particulate aluminum silicate or other similar materials; carbon black or graphite in fiber or powder form; boron in powder or salt form; Kevlar in fiber form; cotton flock; nylon flock; glass in nearly any form; ceramic materials in nearly any form; Cermet, i.e., ceramic-metal, materials in any form; Hi-Sil; and metals in any form. Other compounds may be used such as calcium carbonate, various clays, and plastics such as ground polypropylene. Regarding the use of metals, nearly any metal, preferably in fine particulate form, may be utilized. Examples of suitable metals include aluminum, magnesium, beryllium, iron, titanium, tungsten, copper, zinc, and alloys or oxides thereof. Examples of such alloys include brass or bronze. It is also contemplated to utilize other materials as filler, weighting, or reinforcing agents such as metal stearate salts, silicon carbide, ceramic whiskers, and combinations thereof.

Furthermore, the present inventors have identified several preferred metallic compounds and combinations of materials for incorporation in the one or more silicone material layers and/or core. These preferred combinations include, but are not limited to: beryllium oxide, aluminum oxide, titanium dioxide and graphite powder, titanium dioxide and ceramic powder, and combinations thereof.

Non-Silicone Core

For preferred embodiment golf balls comprising one or more silicone interior layers and a non-silicone core, the non-silicone core is preferably as follows.

The core used in this aspect of the present invention is a specially produced softened polybutadiene elastomeric solid core having a conventional diameter of about 1.540 to 1.545 inches. The core is produced from a composition comprising a base elastomer selected from polybutadiene and mixtures of polybutadiene with other elastomers, at least one metallic salt of an unsaturated carboxylic acid (a co-crosslinking agent), and free radical initiator (a co-crosslinking agent). In addition, a suitable and compatible modifying ingredient including, but not limited to metal activators, fatty acids, fillers, polypropylene powder and other additives may be included. Of particular concern, only a limited amount of the metallic salt of an unsaturated carboxylic acid is included in the core compositions in order to produce the degree of core. softness and weight desired. In this regard, it is understood that when a larger overall ball is desired, the composition of the core is adjusted so that the molded finished ball falls within the weight parameters set forth by the U.S.G.A. Since the finished golf balls must still meet the U.S.G.A. weight limitation of 1.620 ounces, the core component of the larger and thicker covered balls are designed to be not only softer, but also lighter in weight.

In such circumstances, the specific gravity of the core is less than that of a standard core since the larger ball must weigh the same as a standard ball. The core generally weighs about 36 to 37 grams for an standard sized finished ball and about 33 to 34 grams for an oversized finished ball.

The core composition produces a softer molded core which still maintains the resilience (C.O.R.), compression (hardness) and durability characteristics required. The overall molded core has a PGA compression of about 45 to 85, preferably in the range of about 70–80. Its Riehle compression is about 75 or more, preferably in the range of about 75 to about 115, and the resilience of the core is about 0.760 to about 0.780.

The specially produced core compositions and resulting molded cores of the present invention are manufactured using relatively conventional techniques. In this regard, the core compositions of the invention may be based on polybutadiene, and mixtures of polybutadiene with other elastomers. It is preferred that the base elastomer have a relatively high molecular weight. The broad range for the molecular weight of suitable base elastomers is from about 50,000 to about 500,000. A more preferred range for the molecular weight of the base elastomer is from about 100,000 to about 500,000. As a base elastomer for the core composition, cis-polybutadiene is preferably employed, or a blend of cis-polybutadiene with other elastomers may also be utilized. Most preferably, cis-polybutadiene having a weight-average molecular weight of from about 100,000 to about 500,000 is employed. Along this line, it has been found that the high cis-polybutadiene manufactured and sold by Shell Chemical Co., Houston, Tex., under the tradename Cariflex BR-1220, and the polyisoprene available from Muehlstein, H & Co., Greenwich, Connecticut under the designation "SKI 35" are particularly well suited.

The unsaturated carboxylic acid component of the core composition (a co-crosslinking agent) is the reaction product of the selected carboxylic acid or acids and an oxide or carbonate of a metal such as zinc, magnesium, barium, calcium, lithium, sodium, potassium, cadmium, lead, tin, and the like. Preferably, the oxides of polyvalent metals such as zinc, magnesium and cadmium are used, and most preferably, the oxide is zinc oxide.

Exemplary of the unsaturated carboxylic acids which find utility in the present core compositions are acrylic acid, methacrylic acid, itaconic acid, crotonic acid, sorbic acid, and the like, and mixtures thereof. Preferably, the acid component is either acrylic or methacrylic acid. Usually, from about 15 to about 25, and preferably from about 17 to about 21 parts by weight of the carboxylic acid salt, such as zinc diacrylate, is included in the core composition. The unsaturated carboxylic acids and metal salts thereof are generally soluble in the elastomreric base, or are readily dispersible.

The free radical initiator included in the core composition is any known polymerization initiator (a co-crosslinking agent) which decomposes during the cure cycle. The term "free radical initiator" as used herein refers to a chemical which, when added to a mixture of the elastomeric blend and a metal salt of an unsaturated, carboxylic acid, promotes crosslinking of the elastomers by the metal salt of the unsaturated carboxylic acid. The amount of the selected initiator present is dictated only by the requirements of catalytic activity as a polymerization initiator. Suitable initiators include peroxides, persulfates, azo compounds and hydrazides. Peroxides which are readily commercially available are conveniently used in the present invention, generally in amounts of from about 0.1 to about 10.0 and preferably in amounts of from about 0.3 to about 3.0 parts by weight per each 100 parts of elastomer.

Exemplary of suitable peroxides for the purposes of the present invention are dicumyl peroxide, n-butyl 4,4'-bis (butylperoxy) valerate, 1,1-bis(t-butylperoxy)-3,3,5-trimethyl cyclohexane, di-t-butyl peroxide and 2,5-di-(t-butylperoxy)-2,5 dimethyl hexane and the like, as well as mixtures thereof. It will be understood that the total amount of initiators used will vary depending on the specific end product desired and the particular initiators employed.

Examples of such commercially available peroxides are Luperco 230 or 231 XL sold by Atochem, Lucidol Division, Buffalo, N.Y., and Trigonox 17/40 or 29/40 sold by Akzo Chemie America, Chicago, Ill. In this regard Luperco 230 XL and Trigonox 17/40 are comprised of n-butyl 4,4-bis (butylperoxy) valerate; and, Luperco 231 XL and Trigonox 29/40 are comprised of 1,1-bis(t-butylperoxy)-3,3,5-trimethyl cyclohexane. The one hour half life of Luperco 231 XL is about 112° C., and the one hour half life of Trigonox 29/40 is about 129° C.

The core compositions of the present invention may additionally contain any other suitable and compatible modifying ingredients including, but not limited to, metal oxides, fatty acids, and diisocyanates and polypropylene powder resin. For example, Papi 94, a polymeric diisocyanate, commonly available from Dow Chemical Co., Midland, Mich., is an optional component in the rubber compositions. It can range from about 0 to 5 parts by weight per 100 parts by weight rubber (phr) component, and acts as a moisture scavenger. In addition, it has been found that the addition of a polypropylene powder resin results in a core which is too hard (i.e. exhibits low compression) and thus allows for a reduction in the amount of crosslinking agent utilized to soften the core to a normal or below normal compression.

Furthermore, because polypropylene powder resin can be added to core composition without an increase in weight of the molded core upon curing, the addition of the polypropylene powder allows for the addition of higher specific gravity fillers, such as mineral fillers. Since the crosslinking agents utilized in the polybutadiene core compositions are expensive and/or the higher specific gravity fillers are relatively inexpensive, the addition of the polypropylene powder resin substantially lowers the cost of the golf ball cores while maintaining, or lowering, weight and compression.

The polypropylene ($C_3H_5$) powder suitable for use in the present invention has a specific gravity of about 0.90 g/cm$^3$, a melt flow rate of about 4 to about 12 and a particle size distribution of greater than 99% through a 20 mesh screen. Examples of such polypropylene powder resins include those sold by the Amoco Chemical Co., Chicago, Ill., under the designations "6400 P", "7000 P" and "7200 P". Generally, from 0 to about 25 parts by weight polypropylene powder per each 100 parts of elastomer are included in the present invention.

Various activators may also be included in the compositions of the present invention. For example, zinc oxide and/or magnesium oxide are activators for the polybutadiene. The activator can range from about 2 to about 30 parts by weight per 100 parts by weight of the rubbers (phr) component.

Moreover, filler-reinforcement agents may be added to the composition of the present invention. Since the specific gravity of polypropylene powder is very low, and when compounded, the polypropylene powder produces a lighter molded core, when polypropylene is incorporated in the core compositions, relatively large amounts of higher gravity fillers may be added so long as the specific core weight limitations are met. Additional benefits may be obtained by the incorporation of relatively large amounts of higher specific gravity, inexpensive mineral fillers such as calcium carbonate. Such fillers as are incorporated into the core compositions should be in finely divided form, as for example, in a size generally less than about 30 mesh and preferably less than about 100 mesh U.S. standard size. The amount of additional filler included in the core composition is primarily dictated by weight restrictions and preferably is included in amounts of from about 10 to about 100 parts by weight per 100 parts rubber.

The preferred fillers are relatively inexpensive and heavy and serve to lower the cost of the ball and to increase the weight of the ball to closely approach the U.S.G.A. weight limit of 1.620 ounces. However, if thicker cover compositions are to be applied to the core to produce larger than normal (i.e. greater than 1.680 inches in diameter) balls, use of such fillers and modifying agents will be limited in order to meet the U.S.G.A. maximum weight limitations of 1.620 ounces. Exemplary fillers include mineral fillers such as limestone, silica, micabarytes, calcium carbonate, or clays. Limestone is ground calcium/magnesium carbonate and is used because it is an inexpensive, heavy filler.

As indicated, ground flash filler may be incorporated and is preferably 20 mesh ground up center stock from the excess flash from compression molding. It lowers the cost and may increase the hardness of the ball.

Fatty acids or metallic salts of fatty acids may also be included in the compositions, functioning to improve moldability and processing. Generally, free-fatty acids having from about 10 to about 40 carbon atoms, and preferably having from about 15 to about 20 carbon atoms, are used. Exemplary of suitable fatty acids are stearic acid and linoleic acids, as well as mixtures thereof. Exemplary of suitable metallic salts of fatty acids include zinc stearate. When included in the core compositions, the fatty acid component is present in amounts of from about 1 to about 25, preferably in amounts from about 2 to about 15 parts by weight based on 100 parts rubber (elastomer).

It is preferred that the core compositions include stearic acid as the fatty acid adjunct in an amount of from about 2 to about 5 parts by weight per 100 parts of rubber.

Diisocyanates may also be optionally included in the core compositions when utilized, the diioscyanates are included in amounts of from about 0.2 to about 5.0 parts by weight based on 100 parts rubber. Exemplary of suitable diisocyanates is 4,4'-diphenylmethane diisocyanate and other polyfunctional isocyanates know to the art.

Furthermore, the dialkyl tin difatty acids set forth in U.S. Pat. No. 4,844,471, the dispersing agents disclosed in U.S. Pat. No. 4,838,556, and the dithiocarbamates set forth in U.S. Pat. No. 4,852,884 may also be incorporated into the polybutadiene compositions of the present invention. The specific types and amounts of such additives are set forth in the above identified patents, which are incorporated herein by reference.

The core compositions of the invention are generally comprised of 100 parts by weight of a base elastomer (or rubber) selected from polybutadiene and mixtures of polybutadiene with other elastomers, 15 to 25 parts by weight of at least one metallic salt of an unsaturated carboxylic acid, and 1 to 10 parts by weight of a free radical initiator. As indicated above, additional suitable and compatible modifying agents such as particulate polypropylene resin, fatty acids, and secondary additives such as Pecan shell flour, ground flash (i.e. grindings from previously manufactured cores of substantially identical construction), barium sulfate, zinc oxide, etc. may be added to the core compositions to adjust the weight of the ball as necessary in order to have the finished molded ball (core, cover and coatings) to closely approach the U.S.G.A. weight limit of 1.620 ounces.

In producing golf ball cores utilizing the present compositions, the ingredients may be intimately mixed using, for example, two roll mills or a Banbury mixer until the composition is uniform, usually over a period of from about 5 to about 20 minutes. The sequence of addition of components is not critical. A preferred blending sequence is as follows.

The elastomer, polypropylene powder resin (if desired), fillers, zinc salt, metal oxide, fatty acid, and the metallic dithiocarbamate (if desired), surfactant (if desired), and tin difatty acid (if desired), are blended for about 7 minutes in an internal mixer such as a Banbury mixer. As a result of shear during mixing, the temperature rises to about 200° F. The initiator and diisocyanate are then added and the mixing continued until the temperature reaches about 220° F. whereupon the batch is discharged onto a two roll mill, mixed for about one minute and sheeted out.

The sheet is rolled into a "pig" and then placed in a Barwell preformer and slugs are produced. The slugs are then subjected to compression molding at about 320° F. for about 14 minutes. After molding, the molded cores are cooled, the cooling effected at room temperature for about 4 hours or in cold water for about one hour. The molded cores are subjected to a centerless grinding operation whereby a thin layer of the molded core is removed to produce a round core having a diameter of 1.540 to 1.545 inches. Alternatively, the cores are used in the as-molded state with no grinding needed to achieve roundness.

The mixing is desirably conducted in such a manner that the composition does not reach incipient polymerization temperatures during the blending of the various components.

Usually the curable component of the composition will be cured by heating the composition at elevated temperatures on the order of from about 275° F. to about 350° F., preferably and usually from about 290° F. to about 325° F., with molding of the composition effected simultaneously with the curing thereof. The composition can be formed into a core structure by any one of a variety of molding techniques, e.g. injection, compression, or transfer molding. When the composition is cured by heating, the time required for heating will normally be short, generally from about 10 to about 20 minutes, depending upon the particular curing agent used. Those of ordinary skill in the art relating to free radical curing agents for polymers are conversant with adjustments of cure times and temperatures required to effect optimum results with any specific free radical agent.

After molding, the core is removed from the mold and the surface thereof, preferably treated to facilitate adhesion thereof to the covering materials. Surface treatment can be effected by any of the several techniques known in the art, such as corona discharge, ozone treatment, sand blasting, and the like. Preferably, surface treatment is effected by grinding with an abrasive wheel.

Molding or otherwise forming the silicone layers and/or core may further entail additional considerations such as follows. A silicone mantle could be applied directly over a core, either a core comprising a silicone composition or as otherwise described herein, or sandwiched between two or more non-silicone layers. There are several considerations or practices that may be followed in a preferred technique for molding a core and/or one or more layers comprising a silicone material.

A vessel which is pressure-rated and of adequate size to degas the desired amount of silicone material is preferably employed. A vacuum system is used to pull or otherwise remove air induced during the mixing cycle from the material. This process insures a void-free molded component.

An oven can be used to accelerate the cure rate of the silicone material. Oven temperature should not exceed 200° C. (396° F.). Most silicone molded materials should not be exposed to elevated temperatures for more than 2 hours.

Certain chemicals, curing agents, plasticizers and materials can inhibit cure. The most common are: organo-tin and other organo-metallic compounds; silicone rubber containing organo-tin catalyst; sulfur, polysulfides, polysulfones and other sulfur-containing materials; amines, urethanes, and amine containing materials; and unsaturated hydrocarbon plasticizers.

Should a substrate or material be a possible cause of inhibition, it is best to test a small sample for compatibility with the elastomer. The presence of liquid or uncured product at the interface between the suspect substrate and the cured elastomer would indicate cure inhibition.

After molding, the golf balls produced may undergo various further processing steps such as buffing, painting and marking as disclosed in U.S. Pat. No. 4,911,451.

The resulting golf ball produced from the high acid ionomer resin inner layer and the relatively softer, low flexural modulus outer layer provide for an improved multi-layer golf ball which provides for desirable coefficient of restitution and durability properties while at the same time offering the feel and spin characteristics associated with soft balata and balata-like covers of the prior art.

Additional details of the chemistry and processing of silicone materials are provided in "Encyclopedia of Polymer Science and Engineering," Vol. 15, Second Edition, pages 204–308, by B. Hardman and A. Torkelson, herein incorporated by reference.

The core is converted into a golf ball by providing at least one layer of covering material thereon, ranging in thickness from about 0.070 to about 0.130 inches and preferably from about 0.0675 to about 0.1275 inches.

Wound Cores

In addition to using solid molded cores, wound cores may also be incorporated in the golf balls of the present invention. Such wound cores would include a generally spherical center and a rubber thread layer, or windings, enclosing the outer surface of the center.

In this regard, the generally spherical center of the wound cores may be a solid center or a liquid center. The solid center can consist of one or more layers. For example, the solid center can comprise a molded polybutadiene rubber sphere which, although smaller in size, is of similar construction to the molded cores in the two-piece molded golf balls described above.

Suitable solid centers used in the invention are not particularly limited to, but include those made of vulcanized rubber. Such solid centers may be prepared by adding to butadiene rubber, additives such as vulcanizing agents, accelerators, activating agents, fillers, modifiers and aids and then subjecting the mixture to vulcanization and molding.

The solid center (whether of single unitary construction or of multi-layers) generally is from 1 to 1.5 inches in diameter, preferably 1.0625 to 1.42 inches, with a weight of 15 grams to 36 grams, preferably 16.5 to 30 grams.

Alternatively, a liquid center can be incorporated into the wound core of the present invention. The liquid center consists of a hollow spherical bag or sack of conventional vulcanized rubber filled with a liquid, paste or gel. Examples of such a liquid include water, glycerin, sugar-water solutions, corn-syrup, saline solutions, oils, etc. and/or combinations thereof. Examples of pastes can be produced by adding clay, sodium sulfate, barytes, barium sulfate to a minor amount of ethylene glycol in water. Examples of suitable gels include hydrogels, cellulose gels, water gels, etc. The specific gravity of the liquid is, in general, 0.6 to 3 and the specific gravity of the paste is from 0.6 to 3 and the gels from 0.6 to 3. The bag or sack is, in general, from 0.05" to 0.150" in thickness, preferably 0.08 to 0.105 inches in thickness.

The liquid center generally is from 1 to 1.25 inches in diameter, preferably 1.0625 to 1.14 inches, with a weight of 5.5 to 25.5 grams, preferably 15 to 21 grams.

The wound core is formed by winding conventional thread rubber around the outer periphery of the solid or liquid center. The thread rubber may include, for example, those prepared by subjecting natural rubber, or a blend of natural rubber and polyisoprene rubber to vulcanization and molding. The winding process is under high tension to produce a threaded layer over the solid or liquid center. Conventional techniques may be employed in winding the thread rubber and known compositions may be used. Although the thread rubber is not limited with respect to specific gravity, dimension and gage, it usually has a specific gravity of 0.9 to 1. 1, a width of 0.047 to 0.094 and a gage of 0.012 to 0.026 inches.

The rubber thread layer has a radial thickness of 0.010 to 0.315 inches and comprises a wound core having an outer diameter of 1.52 to 1.63 inches. The overall weight of the wound core is 33 to 44 grams, preferably 35 to 39 grams.

The wound core is then converted into a golf ball by providing one or more layers comprising a silicone material and at least one layer of covering material as described below.

Cover

The cover is preferably comprised of a hard, high-stiffness ionomer resin, most preferably a metal cation neutralized high acid ionomer resin containing more than 16% carboxylic acid by weight, or blend thereof. The cover has a Shore D hardness of about 65 or greater.

With respect to the ionomeric cover composition of the invention, ionomeric resins are polymers containing interchain ionic bonding. As a result of their toughness, durability, and flight characteristics, various ionomeric resins sold by E.I. DuPont de Nemours & Company under the trademark "Surlyn®" and more recently, by the Exxon Corporation (see U.S. Pat. No. 4,911,451) under the trademark "Escor®" and the tradename "lotek", have become the materials of choice for the construction of golf ball covers over the traditional "balata" (trans-polyisoprene, natural or synthetic) rubbers.

Ionomeric resins are generally ionic copolymers of an olefin, such as ethylene, and a metal salt of an unsaturated carboxylic acid, such as acrylic acid, methacrylic acid or maleic acid. In some instances, an additional softening comonomer such as an acrylate can also be included to form a terpolymer. The pendent ionic groups in the ionomeric resins interact to form ion-rich aggregates contained in a non-polar polymer matrix. The metal ions, such as sodium, zinc, magnesium, lithium, potassium, calcium, etc. are used to neutralize some portion of the acid groups in the copolymer resulting in a thermoplastic elastomer exhibiting enhanced properties, i.e., improved durability, etc. for golf ball construction over balata.

The ionomeric resins utilized to produce cover compositions can be formulated according to known procedures such as those set forth in U.S. Pat. No. 3,421,766 or British Patent No. 963,380, with neutralization effected according to procedures disclosed in Canadian Patent Nos. 674,595 and 713,631, wherein the ionomer is produced by copolymerizing the olefin and carboxylic acid to produce a copolymer having the acid units randomly distributed along the polymer chain. Broadly, the ionic copolymer generally comprises one or more $\alpha$-olefins and from about 9 to about 20 weight percent of $\alpha$, $\beta$-ethylenically unsaturated mono- or dicarboxylic acid, the basic copolymer neutralized with metal ions to the extent desired.

At least about 20% of the carboxylic acid groups of the copolymer are neutralized by the metal ions (such as sodium, potassium, zinc, calcium, magnesium, and the like) and exist in the ionic state. Suitable olefins for use in preparing the ionomeric resins include ethylene, propylene, butene-1, hexene-1 and the like. Unsaturated carboxylic acids include acrylic, methacrylic, ethacrylic, a-chloroacrylic, crotonic, maleic, fumaric, itaconic acids, and the like. The ionomeric resins utilized in the golf ball industry are generally copolymers of ethylene with acrylic (i.e., Escor®) and/or methacrylic (i.e., Surlyn®) acid. In addition, two or more types of ionomeric resins may be blended in to the cover compositions in order to produce the desired properties of the resulting golf balls.

The cover compositions which may be used in making the golf balls of the present invention are set forth in detail but not limited to those in copending U.S. Ser. No. 07/776,803 filed Oct. 15, 1991, and Ser. No. 07/901,660 filed Jun. 19, 1992, both incorporated herein by reference. In short, the cover material is comprised of hard, high stiffness ionomer resins, preferably containing relatively high amounts of acid (i.e., greater than 16 weight percent acid, preferably from about 17 to about 25 weight percent acid, and more preferably from about 18.5 to about 21.5 weight percent) and at least partially neutralized with metal ions (such as sodium, zinc, potassium, calcium, magnesium and the like). The high acid resins are blended and melt processed to produce compositions exhibiting enhanced hardness and coefficient of restitution values when compared to low acid ionomers, or blends of low acid ionomer resins containing.16 weight percent acid or less. The preferred cover compositions are made from specific blends of two or more high acid ionomers with other cover additives which do not exhibit the processing, playability, distance and/or durability limitations demonstrated by the prior art. However, as more particularly indicated below, the cover composition can also be comprised of one or more low acid ionomers so long as the molded covers exhibit a hardness of 65 or more on the Shore D scale.

Through the use of the softer cores and the hard cover, overall finished balls of the invention exhibit significantly lower spin rates than conventional balls of equal size and weight. Further, reduction in spin are also produced by increasing the thickness of the cover and by decreasing the weight of the softened core.

Further scope of the applicability of the present invention will become apparent from the detailed description given hereinafter. It should, however, be understood that the detailed description and specific examples, while indicating preferred embodiments of the invention, are given by way of illustration only, since various changes and modifications within the spirit and scope of the invention will become apparent to those skilled in the art.

The cover has a Shore D hardness of 65 or greater. Its composition includes a hard, high stiffness preferably high acid ionomer such as that sold by E.I. DuPont de Nemours & Company under the trademark "Surlyn®" and by Exxon Corporation under the trademark "Escor®" or tradename "Iotek", or blends thereof. In addition to the Surlyn® and Escor® or Iotek ionomers, the cover may comprise any ionomer which either alone or in combination with other ionomers produces a molded cover having a Shore D hardness of at least 65. These include lithium ionomers or blends of ionomers with harder non-ionic polymers such as nylon, polyphenylene oxide and other compatible thermoplastics. As briefly mentioned above, examples of cover compositions which may be used are set forth in detail in copending U.S. Ser. No. 07/776,803 filed Oct. 15, 1991, and Ser. No. 07/901,660 filed Jun. 19, 1992, both incorporated herein by reference. Of course, the cover compositions are not limited in any way to those compositions set forth in said copending applications.

The high acid ionomers suitable for use in the present invention are ionic copolymers which are the metal, i.e., sodium, zinc, magnesium, etc., salts of the reaction product of an olefin having from about 2 to 8 carbon atoms and an unsaturated monocarboxylic acid having from about 3 to 8 carbon atoms. Preferably, the ionomeric resins are copolymers of ethylene and either acrylic or methacrylic acid. In some circumstances, an additional comonomer such as an acrylate ester (i.e., iso- or n-butylacrylate, etc.) can also be included to produce a softer terpolymer. The carboxylic acid groups of the copolymer are partially neutralized (i.e., approximately 10–75%, preferably 30–70%) by the metal ions. Each of the high acid ionomer resins included in the cover compositions of the invention contains greater than about 16% by weight of a carboxylic acid, preferably from about 17% to about 25% by weight of a carboxylic acid, more preferably from about 18.5% to about 21.5% by weight of a carboxylic acid.

Although the cover composition preferably includes a high acid ionomeric resin and the scope of the patent embraces all known high acid ionomeric resins falling within the parameters set forth above, only a relatively limited number of these high acid ionomeric resins are currently available. In this regard, the high acid ionomeric resins available from E.I. DuPont de Nemours Company under the trademark "Surlyn®", and the high acid ionomer resins available from Exxon Corporation under the trademark "Escor®" or tradename "Iotek" are examples of available high acid ionomeric resins which may be utilized in the present invention.

The high acid ionomeric resins available from Exxon under the designation "Escor®" and or "Iotek", are somewhat similar to the high acid ionomeric resins available under the "Surlyn®" trademark. However, since the Escor®/Iotek ionomeric resins are sodium or zinc salts of poly (ethylene acrylic acid) and the "Surlyn®" resins are zinc, sodium, magnesium, etc. salts of poly(ethylene methacrylic acid), distinct differences in properties exist.

Examples of the high acid methacrylic acid based ionomers found suitable for use in accordance with this invention include Surlyn® AD-8422 (sodium cation), Surlyn® 8162 (zinc cation), Surlyn® SEP-503-1 (zinc cation), and Surlyn® SEP-503-2 (magnesium cation). According to DuPont, all of these ionomers contain from about 18.5 to about 21.5% by weight methacrylic acid.

More particularly, Surlyn® AD-8422 is currently commercially available from DuPont in a number of different grades (i.e., AD-8422-2, AD-8422-3, AD-8422-5, etc.) based upon differences in melt index. According to DuPont, Surlyn® AD-8422 offers the following general properties when compared to Surlyn® 8920 the stiffest, hardest of all on the low acid grades (referred to as "hard" ionomers in U.S. Pat. No. 4,884,814) as shown below in Table 10:

TABLE 10

| | LOW ACID (15 wt % Acid) | HIGH ACID (>20 wt % Acid) | |
| --- | --- | --- | --- |
| | SURLYN® 8920 | SURLYN® 8422-2 | SURLYN® 8422-3 |
| IONOMER | | | |
| Cation | Na | Na | Na |
| Melt Index | 1.2 | 2.8 | 1.0 |
| Sodium, Wt % | 2.3 | 1.9 | 2.4 |
| Base Resin MI | 60 | 60 | 60 |
| MP$^1$, °C. | 88 | 86 | 85 |
| FP, °C. | 47 | 48.5 | 45 |
| COMPRESSION MOLDING$^2$ | | | |
| Tensile Break, psi | 4350 | 4190 | 5330 |
| Yield, psi | 2880 | 3670 | 3590 |
| Elongation, % | 315 | 263 | 289 |
| Flex Mod, K psi | 53.2 | 76.4 | 88.3 |
| Shore D hardness | 66 | 67 | 68 |

$^1$DSC second heat, 10° C./min heating rate.
$^2$Samples compression molded at 150° C. annealed 24 hours at 60° C. 8422-2, -3 were homogenized at 190° C. before molding.

In comparing Surlyn® 8920 to Surlyn® 8422-2 and Surlyn® 8422-3, it is noted that the high acid Surlyn® 8422-2 and 8422-3 ionomers have a higher tensile yield, lower elongation, slightly higher Shore D hardness and much higher flexural modulus. Surlyn® 8920 contains 15 weight percent methacrylic acid and is 59% neutralized with sodium.

In addition, Surlyn® SEP-503-1 (zinc cation) and Surlyn® SEP-503-2 (magnesium cation) are high acid zinc and magnesium versions of the Surlyn® AD 8422 high acid ionomers. When compared to the Surlyn® AD 8422 high acid ionomers, the Surlyn SEP-503-1 and SEP-503-2 ionomers can be defined as follows in Table 11:

TABLE 11

| Surlyn® Ionomer | Ion | Melt Index | Neutralization % |
| --- | --- | --- | --- |
| AD 8422-3 | Na | 1.0 | 45 |
| SEP 503-1 | Zn | 0.8 | 38 |
| SEP 503-2 | Mg | 1.8 | 43 |

Furthermore, Surlyn® 8162 is a zinc cation ionomer resin containing approximately 20% by weight (i.e. 18.5–21.5% weight) methacrylic acid copolymer that has been 30–70% neutralized. Surlyn® 8162 is currently commercially available from DuPont.

Examples of the high acid acrylic acid based ionomers suitable for use in the present invention include the Escor® or Iotek high acid ethylene acrylic acid ionomers produced by Exxon. In this regard, Escor® or Iotek 959 is a sodium ion neutralized ethylene-acrylic acid copolymer. According to Exxon, Ioteks 959 and 960 contain from about 19.0 to about 21.0% by weight acrylic acid with approximately 30 to about 70 percent of the acid groups neutralized with sodium and zinc ions, respectively. The physical properties of these high acid acrylic acid based ionomers are as follows as shown in Table 12:

TABLE 12

| PROPERTY | ESCOR ® (IOTEK) 959 | ESCOR ® (IOTEK) 960 |
|---|---|---|
| Melt Index, g/10 min | 2.0 | 1.8 |
| Cation | Sodium | Zinc |
| Melting Point ° F. | 172 | 174 |
| Vicat Softening Point, ° F. | 130 | 131 |
| Tensile @ Break, psi | 4600 | 3500 |
| Elongation @ Break, % | 325 | 430 |
| Hardness, Shore D | 66 | 57 |
| Flexural Modulus, psi | 66,000 | 27,000 |

Furthermore, as a result of the development by the inventors of a number of new high acid ionomers neutralized to various extents by several different types of metal cations, such as by manganese, lithium, potassium, calcium and nickel cations, several new high acid ionomers and/or high acid ionomer blends besides sodium, zinc and magnesium high acid ionomers or ionomer blends are now available for golf ball cover production. It has been found that these new cation neutralized high acid ionomer blends produce cover compositions exhibiting enhanced hardness and resilience due to synergies which occur during processing. Consequently, the metal cation neutralized high acid ionomer resins recently produced can be blended to produce substantially harder covered golf balls having higher C.O.R.'s than those produced by the low acid ionomer covers presently commercially available.

More particularly, several new cation neutralized high acid ionomer resins have been produced by the inventors by neutralizing, to various extents, high acid copolymers of an alpha-olefin and an alpha, beta-unsaturated carboxylic acid with a wide variety of different metal cation salts. This discovery is the subject matter of U.S. application Ser. No. 901,660, incorporated herein by reference. It has been found that numerous new metal cation neutralized high acid ionomer resins can be obtained by reacting a high acid copolymer (i.e. a copolymer containing greater than 16% by weight acid, preferably from about 17 to about 25 weight percent acid, and more preferably about 20 weight percent acid), with a metal cation salt capable of ionizing or neutralizing the copolymer to the extent desired (i.e. from about 10% to 90%).

The base copolymer is made up of greater than 16% by weight of an alpha, beta-unsaturated carboxylic acid and an alpha-olefin. Optionally, a softening comonomer can be included in the copolymer. Generally, the alpha-olefin has from 2 to 10 carbon atoms and is preferably ethylene, and the unsaturated carboxylic acid is a carboxylic acid having from about 3 to 8 carbons. Examples of such acids include acrylic acid, methacrylic acid, ethacrylic acid, chloroacrylic acid, crotonic acid, maleic acid, fumaric acid, and itaconic acid, with acrylic acid being preferred.

The softening comonomer that can be optionally included in the invention may be selected from the group consisting of vinyl esters of aliphatic carboxylic acids wherein the acids have 2 to 10 carbon atoms, vinyl ethers wherein the alkyl groups contains 1 to 10 carbon atoms, and alkyl acrylates or methacrylates wherein the alkyl group contains 1 to 10 carbon atoms. Suitable softening comonomers include vinyl acetate, methyl acrylate, methyl methacrylate, ethyl acrylate, ethyl methacrylate, butyl acrylate, butyl methacrylate, or the like.

Consequently, examples of a number of copolymers suitable for use to produce the high acid ionomers included in the present invention include, but are not limited to, high acid embodiments of an ethylene/acrylic acid copolymer, an ethylene/methacrylic acid copolymer, an ethylene/itaconic acid copolymer, an ethylene/maleic acid copolymer, an ethylene/methacrylic acid/vinyl acetate copolymer, an ethylene/acrylic acid/vinyl alcohol copolymer, etc. The base copolymer broadly contains greater than 16% by weight unsaturated carboxylic acid, from about 30 to about 83% by weight ethylene and from 0 to about 40% by weight of a softening comonomer. Preferably, the copolymer contains about 20% by weight unsaturated carboxylic acid and about 80% by weight ethylene. Most preferably, the copolymer contains about 20% acrylic acid with the remainder being ethylene.

Along these lines, examples of the preferred high acid base copolymers which fulfill the criteria set forth above, are a series of ethylene-acrylic copolymers which are commercially available from The Dow Chemical Company, Midland, Michigan, under the "Primacor" designation. These high acid base copolymers exhibit the typical properties set forth below in Table 13.

TABLE 13

Typical Properties of Primacor Ethylene-Acrylic Acid Copolymers

| GRADE | PERCENT ACID | DENSITY, g/cc | MELT INDEX, g/10 min | TENSILE YD. ST (psi) | FLEXURAL MODULUS (psi) | VICAT SOFT PT (° C.) | SHORE D HARDNESS |
|---|---|---|---|---|---|---|---|
| ASTM | | D-792 | D-1238 | D-638 | D-790 | D-1525 | D-2240 |
| 5980 | 20.0 | 0.958 | 300.0 | — | 4800 | 43 | 50 |
| 5990 | 20.0 | 0.955 | 1300.0 | 650 | 2600 | 40 | 42 |
| 5990 | 20.0 | 0.955 | 1300.0 | 650 | 3200 | 40 | 42 |
| 5981 | 20.0 | 0.960 | 300.0 | 900 | 3200 | 46 | 48 |
| 5981 | 20.0 | 0.960 | 300.0 | 900 | 3200 | 46 | 48 |
| 5983 | 20.0 | 0.958 | 500.0 | 850 | 3100 | 44 | 45 |
| 5991 | 20.0 | 0.953 | 2600.0 | 635 | 2600 | 38 | 40 |

[1]The Melt Index values are obtained according to ASTM D-1238, at 190° C.

Due to the high molecular weight of the Primacor 5981 grade of the ethylene-acrylic acid copolymer, this copolymer is the more preferred grade utilized in the invention.

The metal cation salts utilized in the invention are those salts which provide the metal cations capable of neutralizing, to various extents, the carboxylic acid groups of the high acid copolymer. These include acetate, oxide or hydroxide salts of lithium, calcium, zinc, sodium, potassium, nickel, magnesium, and manganese.

Examples of such lithium ion sources are lithium hydroxide monohydrate, lithium hydroxide, lithium oxide and lithium acetate. Sources for the calcium ion include calcium hydroxide, calcium acetate and calcium oxide. Suitable zinc ion sources are zinc acetate dihydrate and zinc acetate, a blend of zinc oxide and acetic acid. Examples of sodium ion sources are sodium hydroxide and sodium acetate. Sources for the potassium ion include potassium hydroxide and potassium acetate. Suitable nickel ion sources are nickel acetate, nickel oxide and nickel hydroxide. Sources of magnesium include magnesium oxide, magnesium hydroxide, magnesium acetate. Sources of manganese include manganese acetate and manganese oxide.

The new metal cation neutralized high acid ionomer resins are produced by reacting the high acid base copolymer with various amounts of the metal cation salts above the crystalline melting point of the copolymer, such as at a temperature from about 200° F. to about 500° F., preferably from about 250° F. to about 350° F. under high shear conditions at a pressure of from about 10 psi to 10,000 psi. Other well known blending techniques may also be used. The amount of metal cation salt utilized to produce the new metal cation neutralized high acid based ionomer resins is the quantity which provides a sufficient amount of the metal cations to neutralize the desired percentage of the carboxylic acid groups in the high acid copolymer. The extent of neutralization is generally from about 10% to about 90%.

As indicated below in Table 14, more specifically in Example 1 of U.S. application Ser. No. 901,660, a number of new types of metal cation neutralized high acid ionomers can be obtained from the above indicated process. These include new high acid ionomer resins neutralized to various extents with manganese, lithium, potassium, calcium and nickel cations. In addition, when a high acid ethylene/acrylic acid copolymner is utilized as the base copolymer component of the invention and this component is subsequently neutralized to various extents with the metal cation salts producing acrylic acid based high acid ionomer resins neutralized with cations such as sodium, potassium, lithium, zinc, magnesium, manganese, calcium and nickel, several new cation neutralized acrylic acid based high acid ionomer resins are produced.

TABLE 14

| Formulation No. | Wt.-% Cation Salt | Wt.-% Neutralization | Melt Index | C.O.R. | Shore D Hardness |
| --- | --- | --- | --- | --- | --- |
| 1(NaoH) | 6.98 | 67.5 | 0.9 | .804 | 71 |
| 2(NaoH) | 5.66 | 54.0 | 2.4 | .808 | .73 |
| 3(NaoH) | 3.84 | 35.9 | 12.2 | .812 | 69 |
| 4(NaoH) | 2.91 | 27.0 | 17.5 | .812 | (brittle) |
| 5(MnAc) | 19.6 | 71.7 | 7.5 | .809 | 73 |
| 6(MnAc) | 23.1 | 88.3 | 3.5 | .814 | 77 |
| 7(MnAc) | 15.3 | 53.0 | 7.5 | .810 | 72 |
| 8(MnAc) | 26.5 | 106 | 0.7 | .813 | (brittle) |
| 9(LiOH) | 4.54 | 71.3 | 0.6 | .810 | 74 |
| 10(LiOH) | 3.38 | 52.5 | 4.2 | .818 | 72 |
| 11(LiOH) | 2.34 | 35.9 | 18.6 | .815 | 72 |

TABLE 14-continued

| 12(KOH) | 5.30 | 36.0 | 19.3 | Broke | 70 |
| --- | --- | --- | --- | --- | --- |
| 13(KOH) | 8.26 | 57.9 | 7.18 | .804 | 70 |
| 14(KOH) | 10.7 | 77.0 | 4.3 | .801 | 67 |
| 15(ZnAc) | 17.9 | 71.5 | 0.2 | .806 | 71 |
| 16(ZnAc) | 13.9 | 53.0 | 0.9 | .797 | 69 |
| 17(ZnAc) | 9.91 | 36.1 | 3.4 | .793 | 67 |
| 18(MgAc) | 17.4 | 70.7 | 2.8 | .814 | 74 |
| 19(MgAc) | 20.6 | 87.1 | 1.5 | .815 | 76 |
| 20(MgAc) | 13.8 | 53.8 | 4.1 | .814 | 74 |
| 21(CaAc) | 13.2 | 69.2 | 1.1 | .813 | 74 |
| 22(CaAc) | 7.12 | 34.9 | 10.1 | .808 | 70 |

Controls:
50/50 Blend of Ioteks 8000/7030 C.O.R. = .810/65 Shore D Hardness
DuPont High Acid Surlyn ® 8422 (Na) C.O.R. = .811/70 Shore D Hardness
DuPont High Acid Surlyn ® 8162 (Zn) C.O.R. = .807/65 Shore D Hardness
Exxon High Acid Iotek EX-960 (Zn) C.O.R. = .796/65 Shore D Hardness

| Formulation No. | Wt.-% Cation Salt | Wt.-% Neutralization | Melt Index | C.O.R. |
| --- | --- | --- | --- | --- |
| 23(MgO) | 2.91 | 53.5 | 2.5 | .813 |
| 24(MgO) | 3.85 | 71.5 | 2.8 | .808 |
| 25(MgO) | 4.76 | 89.3 | 1.1 | .809 |
| 26(MgO) | 1.96 | 35.7 | 7.5 | .815 |

Control for Formulations 23–26 is 50/50 Iotek 8000/7030, C.O.R. = .814, Formulation 26 C.O.R. was normalized to that control accordingly

| Formula-No. | Wt.-% Cation Salt | Wt.-% Neutralization | Melt Index | C.O.R. | Shore D Hardness |
| --- | --- | --- | --- | --- | --- |
| 27(NiAc) | 13.04 | 61.1 | 0.2 | .802 | 71 |
| 28(NiAc) | 10.71 | 48.9 | 0.5 | .799 | 72 |
| 29(NiAc) | 8.26 | 36.7 | 1.8 | .796 | 69 |
| 30(NiAc) | 5.66 | 24.4 | 7.5 | .786 | 64 |

Control for Formulation Nos. 27–30 is 50/50 Iotek 8000/7030, C.O.R. = .807

When compared to low acid versions of similar cation neutralized ionomer resins, the new metal cation neutralized high acid ionomer resins exhibit enhanced hardness, modulus and resilience characteristics. These are properties that are particularly desirable in a number of thermoplastic fields, including the field of golf ball manufacturing.

When utilized in golf ball cover construction, it has been found that the new acrylic acid based high acid ionomers extend the range of hardness beyond that previously obtainable while maintaining the beneficial properties (i.e. durability, click, feel, etc.) of the softer low acid ionomer covered balls, such as balls produced utilizing the low acid ionomers disclosed in U.S. Pat. Nos. 4,884,814 and 4,911,451, and the recently produced high acid blends disclosed in U.S. application Ser. No. 776,803. Moreover, as a result of the development of a number of new acrylic acid based high acid ionomer resins neutralized to various extents by several different types of metal cations, such as manganese, lithium, potassium, calcium and nickel cations, several new ionomers or ionomer blends are now available for golf ball production. By using these high acid ionomer resins harder, stiffer golf balls having higher C.O.R.s, and thus longer distance, can be obtained.

As will be further noted in the Examples below, other ionomer resins may be used in the cover compositions, such as low acid ionomer resins, so long as the molded cover produces a Shore D hardness of 65 or more. Properties of some of these low acid ionomer resins are provided in the following Table 15:

TABLE 15

Typical Properties of Low Acid Escor ® (Iotek) Ionomers

| | ASTM Method | Units | 4000 | 4010 | 8000 | 8020 |
|---|---|---|---|---|---|---|
| Resin Properties | | | | | | |
| Cation type | | | zinc | zinc | sodium | sodium |
| Melt index | D-1238 | g/10 min. | 2.5 | 1.5 | 0.8 | 1.6 |
| Density | D-1505 | kg/m³ | 963 | 963 | 954 | 960 |
| Melting Point | D-3417 | ° C. | 90 | 90 | 90 | 87.5 |
| Crystallization Point | D-3417 | ° C. | 62 | 64 | 56 | 53 |
| Vicat Softening Point | D-1525 | ° C. | 62 | 63 | 61 | 64 |
| % Weight Acrylic Acid | | | 16 | — | 11 | — |
| % of Acid Groups Cation Neutralized | | | 30 | — | 40 | — |
| Plaque Properties | | | | | | |
| (3 mm thick, compression molded) | | | | | | |
| Tensile at Break | D-638 | MPa | 24 | 26 | 36 | 31.5 |
| Yield point | D-638 | MPa | none | none | 21 | 21 |
| Elongation at break | D-638 | % | 395 | 420 | 350 | 410 |
| 1% Secant modulus | D-638 | MPa | 160 | 160 | 300 | 350 |
| Shore Hardness D | D-2240 | — | 55 | 55 | 61 | 58 |

| | ASTM Method | Units | 8030 | 7010 | 7020 | 7030 |
|---|---|---|---|---|---|---|
| Resin Properties | | | | | | |
| Cation type | | | sodium | zinc | zinc | zinc |
| Melt Index | D-1238 | g/10 min. | 2.8 | 0.8 | 1.5 | 2.5 |
| Density | D-1505 | kg/m³ | 960 | 960 | 960 | 960 |
| Melting Point | D-3417 | ° C. | 87.5 | 90 | 90 | 90 |
| Crystallization Point | D-3417 | ° C. | 55 | — | — | — |
| Vicat Softening Point | D-1525 | ° C. | 67 | 60 | 63 | 62.5 |
| % Weight Acrylic Acid | | | — | — | — | — |
| % of Acid Groups Cation Neutralized | | | — | — | — | — |
| Plaque Properties | | | | | | |
| (3 mm thick, compression molded) | | | | | | |
| Tensile at Break | D-638 | MPa | 28 | 38 | 38 | 38 |
| Yield Point | D-638 | MPa | 23 | none | none | |
| Elongation at Break | D-638 | % | 395 | 500 | 420 | 395 |
| 1% Secant modulus | D-638 | MPa | 390 | — | — | — |
| Shore Hardness D | D-2240 | — | 59 | 57 | 55 | 55 |

In addition to the above noted ionomers, compatible additive materials may also be added to produce the cover compositions of the present invention. These additive materials include dyes (for example, Ultramarine Blue sold by Whitaker, Clark, and Daniels of South Painsfield, N.J.), and pigments, i.e. white pigments such as titanium dioxide (for example Unitane 0–110) zinc oxide, and zinc sulfate, as well as fluorescent pigments. As indicated in U.S. Pat. No. 4,884,814, the amount of pigment and/or dye used in conjunction with the polymeric cover composition depends on the particular base ionomer mixture utilized and the particular pigment and/or dye utilized. The concentration of the pigment in the polymeric cover composition can be from about 1% to about 10% as based on the weight of the base ionomer mixture. A more preferred range is from about 1% to about 5% as based on the weight of the base ionomer mixture. The most preferred range is from about 1% to about 3% as based on the weight of the base ionomer mixture. The most preferred pigment for use in accordance with this invention is titanium dioxide.

Moreover, since there are various hues of white, i.e. blue white, yellow white, etc., trace amounts of blue pigment may be added to the cover stock composition to impart a blue white appearance thereto. However, if different hues of the color white are desired, different pigments can be added to the cover composition at the amounts necessary to produce the color desired.

In addition, it is within the purview of this invention to add to the cover compositions of this invention compatible materials which do not affect the basic novel characteristics of the composition of this invention. Among such materials are antioxidants (i.e. Santonox R), antistatic agents, stabilizers and processing aids. The cover compositions of the present invention may also contain softening agents, such as plasticizers, etc., and reinforcing materials such as glass fibers and inorganic fillers, as long as the desired properties produced by the golf ball covers of the invention are not impaired.

Furthermore, optical brighteners, such as those disclosed in U.S. Pat. No. 4,679,795, may also be included in the cover composition of the invention. Examples of suitable optical brighteners which can be used in accordance with this invention are Uvitex OB as sold by the Ciba-Geigy Chemical Company, Ardsley, N.Y. Uvitex OB is thought to be 2,5-Bis(5-tert-butyl-2-benzoxazoly)thiophene. Examples of other optical brighteners suitable for use in accordance with this invention are as follows: Leucopure EGM as sold by Sandoz, East Hanover, N.J. 07936. Leucopure EGM is thought to be 7-(2n-naphthol(1,2-d)-triazol-2yl)-3phenyl-coumarin. Phorwhite K-20G2 is sold by Mobay Chemical Corporation, P.O. Box 385, Union Metro Park, Union, N.J. 07083, and is thought to be a pyrazoline derivative, Eastobrite OB-1 as sold by Eastman Chemical Products, Inc. Kingsport, Tenn., is thought to be 4,4-Bis(-benzoxaczoly) stilbene. The above-mentioned Uvitex and Eastobrite OB-1 are preferred optical brighteners for use in accordance with this invention.

Moreover, since many optical brighteners are colored, the percentage of optical brighteners utilized must not be excessive in order to prevent the optical brightener from functioning as a pigment or dye in its own right.

The percentage of optical brighteners which can be used in accordance with this invention is from about 0.01% to about 0.5% as based on the weight of the polymer used as a cover stock. A more preferred range is from about 0.05% to about 0.25% with the most preferred range from about 0.10% to about 0.020% depending on the optical properties of the particular optical brightener used and the polymeric environment in which it is a part.

Generally, the additives are admixed with a ionomer to be used in the cover composition to provide a masterbatch (M.B.) of desired concentration and an amount of the masterbatch sufficient to provide the desired amounts of additive is then admixed with the copolymer blends.

The above cover compositions, when processed according to the parameters set forth below and combined with soft cores at thicknesses defined herein to produce covers having a Shore D hardness of 65, provide golf balls with reduced spin ratio. It is noted, however, that the high acid ionomer resins provide for more significant reduction in spin rate than that observed for the low acid ionomer resins.

The cover compositions and molded balls of the present invention may be produced according to conventional melt blending procedures. In this regard, the ionomeric resins are blended along with the masterbatch containing the desired additives in a Banbury type mixer, two-roll mill, or extruded prior to molding. The blended composition is then formed into slabs or pellets, etc. and maintained in such a state until molding is desired. Alternatively a simple dry blend of the pelletized or granulated resins and color masterbatch may be prepared and fed directly into the injection molding machine where homogenization occurs in the mixing section of the barrel prior to injection into the mold. If necessary, further additives such as an inorganic filler, etc., may be added and uniformly mixed before initiation of the molding process.

Moreover, golf balls of the present invention can be produced by molding processes currently well known in the golf ball art. Specifically, the golf balls can be produced by injection molding or compression molding the novel cover compositions about the soft polybutadiene cores to produce a golf ball having a diameter of about 1.680 inches or greater and weighing about 1.620 ounces. In an additional embodiment of the invention, larger molds are utilized to produce the thicker covered oversized golf balls. As indicated, the golf balls of the present invention can be produced by forming covers consisting of the compositions of the invention around the softer polybutadiene cores by conventional molding processes. For example, in compression molding, the cover composition is formed via injection at about 380° F. to about 450° F. into smooth surfaced hemispherical shells which are then positioned around the core in a dimpled golf ball mold and subjected to compression molding at 200–300° F. for 2–10 minutes, followed by cooling at 50–70° F. for 2–10 minutes, to fuse the shells together to form an unitary ball. In addition, the golf balls may be produced by injection molding, wherein the cover composition is injected directly around the core placed in the center of a golf ball mold for a period of time at a mold temperature of from 50° F. to about 100° F. After molding the golf balls produced may undergo various further finishing steps such as buffing, painting, and marking as disclosed in U.S. Pat. No. 4,911,451.

In an alternative embodiment, the resulting ball is larger than the standard 1.680 inch golf ball. Its diameter is in the range of about 1.680 to 1.800 inches, more likely in the range of about 1.700 to 1.800 inches, preferably in the range of 1.710–1.730 inches, and most preferably in the range of about 1.717–1.720 inches. The larger diameter of the golf ball results from the cover thickness which ranges from more than the standard 0.0675 inches up to about 0.130, preferably from about 0.0675 to about 0.1275 inches, more preferably in the range of about 0.0825 to 0.0925, and most preferably in the range of about 0.0860 to 0.0890 inches. The core is of a standard size, roughly about 1.540 to 1.545 inches.

The invention has been described with reference to the preferred embodiment. Obviously, modifications and alterations will occur to others upon a reading and understanding of the preceding detailed description. It is intended that the invention be construed as including all such alterations and modifications insofar as they come within the scope of the appended claims or the equivalents thereof.

Having thus described the invention, we claim:

1. A golf ball comprising:

a core;

an interior layer disposed about said core; and a cover layer disposed about said interior layer;

wherein said interior layer comprises a silicone polymer having a formula $(R_n SiO_{(4-n)/2})_m$, wherein n ranges from 1 to 3, m is at least 2, and R is selected from the group consisting of methyl, fluoroalkyl, phenyl, vinyl, hydrogen, chlorine, alkoxy, acyloxy, alkylamino, and combinations thereof.

2. The golf ball of claim 1 wherein said silicone polymer is at least one of a silicone homopolymer, a silicone random copolymer, a silicone block copolymer, and combinations thereof.

3. The golf ball of claim 2 wherein said silicone polymer is a silicone homopolymer which is polydimethylsiloxane.

4. The golf ball of claim 3 wherein said polydimethylsiloxane is a trimethylsiloxy-terminated polydimethylsiloxane.

5. The golf ball of claim 1 wherein said interior layer comprises a silicone elastomer.

6. The golf ball of claim 5 wherein said silicone elastomer results from crosslinking said silicone polymer.

7. The golf ball of claim 6 wherein said interior layer further comprises a finely divided reinforcing material.

8. The golf ball of claim 7 wherein said finely divided reinforcing material is silica.

9. The golf ball of claim 8 wherein said silica is in the form of fumed silica.

10. The golf ball of claim 8 wherein said silica is in the form of particles and has a specific surface area of from about 20 to about 400 m$^2$/g.

11. The golf ball of claim 1 wherein said interior layer comprises a room temperature vulcanizing (RTV) silicone elastomer.

12. The golf ball of claim 11 wherein said RTV silicone elastomer exhibits a viscosity, prior to curing, of from about 100 to about 1,000,000 mm$^2$/s at 25° C.

13. The golf ball of claim 11 wherein said interior layer comprises a silica filler material.

14. The golf ball of claim 1 wherein said interior layer comprises a heat curing silicone rubber.

15. The golf ball of claim 14 wherein said interior layer further comprises a filler.

16. The golf ball of claim 15 wherein said filler is selected from the group consisting of silica, titanium dioxide, calcium carbonate, and iron oxide.

17. A golf ball comprising:

a core;

an interior layer disposed about said core; and a cover layer disposed about said interior layer;

wherein said interior layer comprises a silicone resin formed from a chlorosilane selected from the group consisting of monomethylchlorosilane, dimethylchlorosilane, diphenylchlorosilane, methylchlorosilane, phenylchlorosilane, monovinylchlorosilane, methylvinylchlorosilane, and combinations thereof.

18. The golf ball of claim 17 wherein said silicone resin, upon curing, exhibits a Shore A hardness of about 40.

19. The golf ball of claim 17 wherein said silicone resin, upon curing, exhibits a tensile strength of about 800 psi.

20. The golf ball of claim 17 wherein said silicone resin, upon curing, exhibits a specific gravity of about 1.11.

21. A golf ball comprising:

a core; and a cover layer disposed about said core; wherein said core comprises a silicone polymer having a formula $(R_nSiO_{(4-n)/2})_m$, wherein n ranges from 1 to 3, m is at least 2, and R is selected from the group consisting of methyl, fluoroalkyl, phenyl, vinyl, hydrogen, chlorine, alkoxy, acyloxy, alkylamino, and combinations thereof.

22. The golf ball of claim 21 wherein said silicone polymer is at least one of a silicone homopolymer, a silicone random copolymer, a silicone block copolymer, and combinations thereof.

23. The golf ball of claim 22 wherein said silicone polymer is said silicone homopolymer which is polydimethylsiloxane.

24. The golf ball of claim 23 wherein said polydimethylsiloxane is a trimethylsiloxy-terminated polydimethylsiloxane.

25. The golf ball of claim 21 wherein said core comprises a silicone elastomer.

26. The golf bail of claim 25 wherein said silicone elastomer results from crosslinking said silicone polymer.

27. The golf ball of claim 26 wherein said core further comprises a finely divided reinforcing material.

28. The golf ball of claim 27 wherein said finely divided reinforcing material is silica.

29. The golf ball of claim 28 wherein said silica is in the form of fumed silica.

30. The golf ball of claim 28 wherein said silica has a specific surface area of from about 20 to about 400 m²/g.

31. The golf ball of claim 21 wherein said core comprises a room temperature vulcanizing (RTV) silicone elastomer.

32. The golf ball of claim 31 wherein said RTV silicone elastomer exhibits a viscosity, prior to curing, of from about 100 to about 1,000,000 mm²/s at 25° C.

33. The golf ball of claim 31 wherein said core comprises a silica filler material.

34. The golf ball of claim 21 wherein said core comprises a heat curing silicone rubber.

35. The golf ball of claim 34 wherein said interior layer further comprises a filler.

36. The golf ball of claim 15 wherein said filler is selected from the group consisting of silica, titanium dioxide, calcium carbonate, iron oxide and combinations thereof.

37. A golf ball comprising:

a core;

an interior layer disposed about said core; and a cover layer disposed about said interior layer;

wherein said core comprises a silicone resin formed from a chlorosilane selected from the group consisting of monomethylchlorosilane, dimethylchlorosilane, diphenylchlorosilane, methylchlorosilane, phenylchlorosilane, monovinylchlorosilane, methylvinylchlorosilane, and combinations thereof.

38. The golf ball of claim 37 wherein said silicone resin, upon cunng, exhibits a Shore A hardness of about 40.

39. The golf ball of claim 37 wherein said silicone resin, upon curing, exhibits a tensile strength of about 800 psi.

40. The golf ball of claim 37 wherein said silicone resin, upon curing, exhibits a specific gravity of about 1.11.

* * * * *